MODULATOR THAT DEVELOPS AND REINFORCES ONE SIDEBAND WHILE DEVELOPING AND ATTENUATING A SECOND SIDEBAND

Filed July 17, 1967 3 Sheets-Sheet 1

United States Patent Office 3,559,106
Patented Jan. 26, 1971

3,559,106

MODULATOR THAT DEVELOPS AND REINFORCES ONE SIDEBAND WHILE DEVELOPING AND ATTENUATING A SECOND SIDEBAND

John R. Grindon, Hazlewood, Mo., assignor to Conductron Corporation, St. Charles, Mo., a corporation of Delaware Filed July 17, 1967, Ser. No. 653,704
Int. Cl. H03c *1/52*
U.S. Cl. 332—41 25 Claims

ABSTRACT OF THE DISCLOSURE

A carrier signal is modulated by a portion of a modulating signal to develop a first sideband and a second sideband which are oppositely-disposed of a predetermined modulation axis, that carrier signal is modulated a second time by a portion of that modulating signal which has been phase-shifted a predetermined number of degrees, the second modulation of that carrier signal develops a third sideband and a fourth sideband which are oppositely-disposed of a second modulation axis that is displaced from said predetermined modulation axis by a predetermined angle, said predetermined number of degrees through which said portion of said modulating signal is phase-shifted and said predetermined angle between said modulation axes substantially totalling one hundred and eighty degrees, the first and third sidebands are combined to buck and cancel each other, the second and fourth sidebands are combined to aid and reinforce each other, and then the carrier signal and any spurious sidebands are removed to provide a single sideband suppressed-carrier signal.

Figure 1:
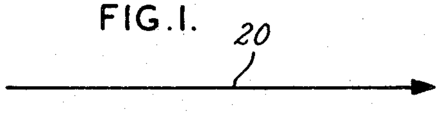

This invention relates to improvements in control systems. More particularly, this invention relates to improvements in control systems which provide single sideband suppressed-carrier signals.

It is, therefore, an object of the present invention to provide an improved control system that can develop a single sideband suppressed-carrier signal.

A control system that can develop a single sideband suppressed-carrier signal is desirable because it can be more efficient, in terms of transmitter power, than can control systems which use other modulation methods; and because a single sideband suppressed-carrier signal utilizes less of the available radio-frequency spectrum than does a carrier signal with a single sideband, and it utilizes still less of the available radio-frequency spectrum than does a signal with two sidebands. As a result, a number of methods have been proposed for developing single sideband suppressed-carrier signals. One of those methods is known as the filter method; and, in that method, a double sideband signal is generated, and then a filter is used to reject the unwanted sideband. Unfortunately, the filter which is needed to enable the filter method to effectively supress the unwanted sideband is both complex and expensive. Another method of developing a single sideband suppressed-carrier signal is known as the phasing method; and that method utilizes two balanced modulators, combined with phase shifters, to cancel out the unwanted sideband. However, the balanced modulators of the phasing method must be well matched for good performance: and that fact and the relatively large number of circuit components which must be used in that method make that method less than satisfactory. It would be desirable to provide a control system which could develop a single sideband suppressed-carrier signal but which utilized a simple and relatively-inexpensive circuit that did not require complicated adjustments. The present invention provides such as a control system; and it is, therefore, an object of the present invention to provide a control system for developing a single sideband suppressed-carrier signal which utilizes a simple and relatively-inexpensive circuit which does not require difficult adjustments.

One preferred embodiment of the control system provided by the present invention applies a portion of a modulating signal to a first moduator to modulate a carrier signal and thereby develop a first sideband and a second sideband which are oppositely disposed of a predetermined modulation axis, applies that modulated carrier signal and also applies a portion of the modulating signal which has been phase-shifted a predetermined number of degrees to a second modulator to develop a third sideband and a fourth sideband which are oppositely-disposed of a second modulation axis that is displaced from said predetermined modulation axis by a predetermined angle, said predtermined number of degrees through which said portion of said modulating signal is phase-shifted and said predetermined angle between said modulation axes substantially totalling one hundred and eighty degrees, combines the first and third sidebands in that second modulator to make them buck and cancel each other, combines the second and fourth sidebands in that second modulator to enable them to aid and reinforce each other, and then the carrier signal and any spurious sidebands are removed to provide a single sideband suppressed-carrier signal. The first modulation axis is substantially straight, and hence the first modulator develops just one sideband on each side of that modulation axis. Similarly, the second modulation axis is substantially straight, and hence the second modulator develops just one sideband on each side of that second modulation axis. As a result, that control system can develop a theoretically perfect single sideband suppressed-carrier signal. It is, therefore, an object of the present invention to provide a control system which applies a portion of a modulating signal to a first modulator to modulate a carrier signal and thereby develop a first sideband and a second sideband which are oppositely disposed of a predetermined modulation axis, applies that carrier signal and also applies a portion of the modulating signal which has been phase-shifted a predetermined number of degrees to a second modulator to develop a third sideband and a fourth sideband which are oppositely-disposed of a second modulation axis that is displaced from said predetermined modulation axis by a predetermined angle, said predetermined number of degrees through which said portion of said modulating signal is phase-shifted and said predetermined angle between said modulation axes substantially totalling one hundred and eighty degrees, combines the first and third sidebands in that second modulator to make them buck and cancel each other, combines the second and fourth sidebands in that second modulator to enable them to aid and reinforce each other, and then the carrier signal and any spurious sidebands are removed to provide a single sideband suppressed-carrier signal.

Other and further objects and advantages of the present invention should become apparent from an examination of the drawing and accompanying description.

In the drawing and accompanying description, several preferred embodiments of control systems that are made in accordance with the principles and teachings of the present invention are shown and described, but it is to be understood that the drawing and accompanying description are for the purpose of illustration only and do not limit the invention and that the invention will be defined by the appended claims.

Figure 2:
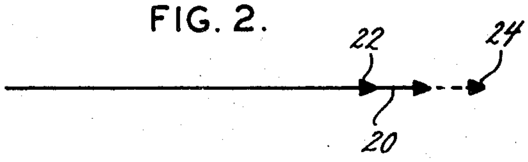
Figures 3, 4, 5, 6, 7:
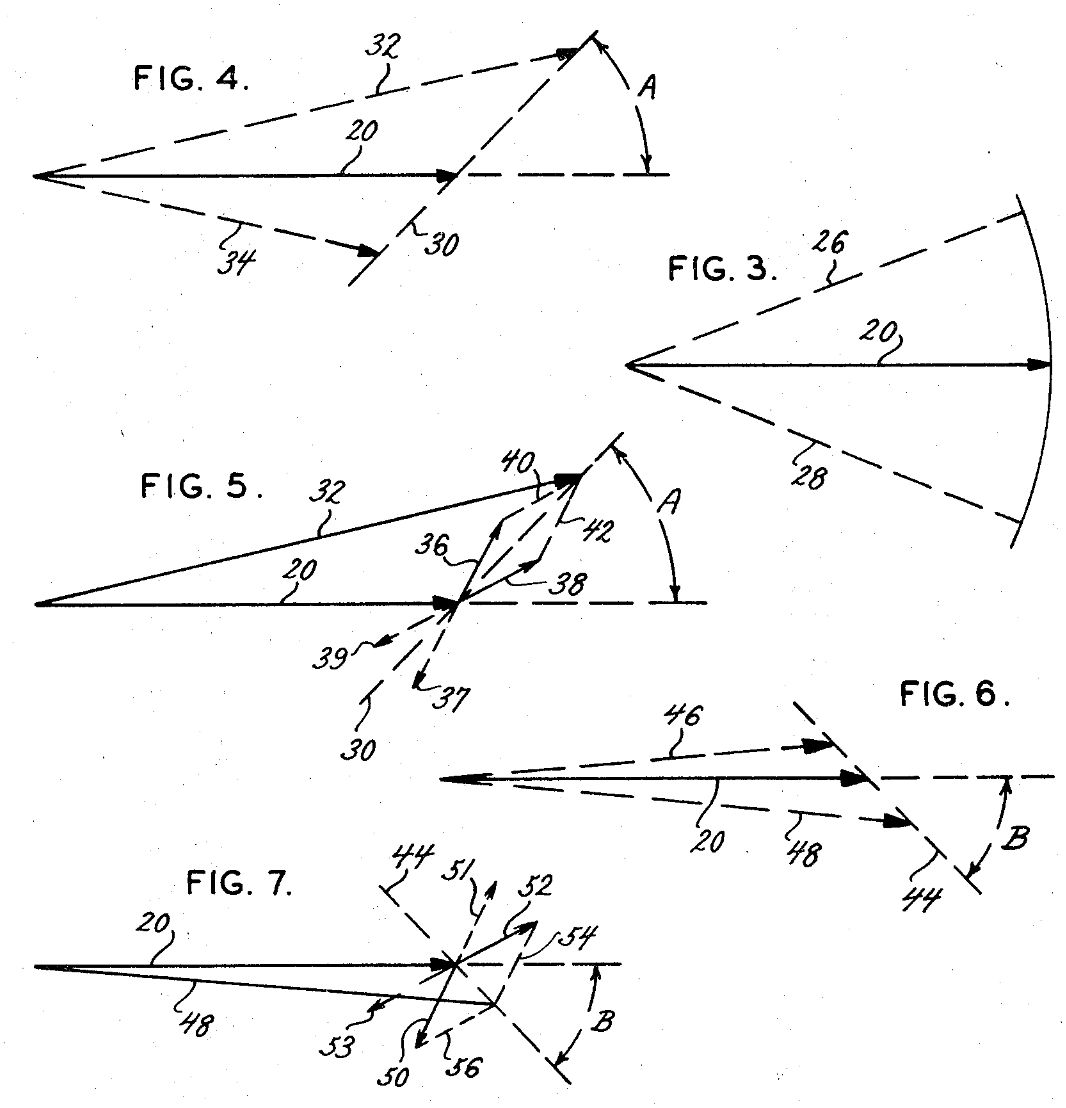
Figure 8:
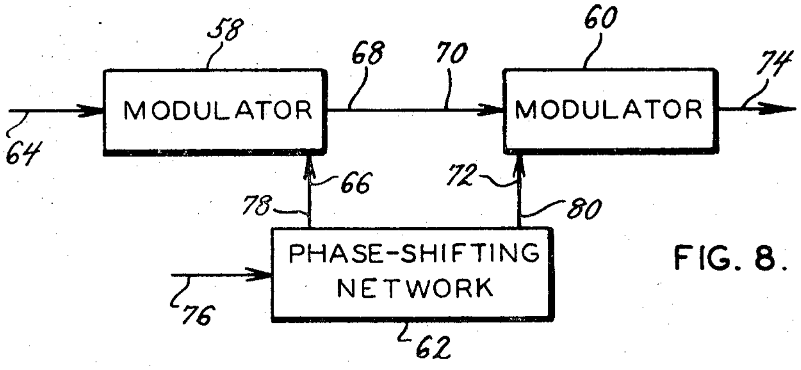
Figure 9:
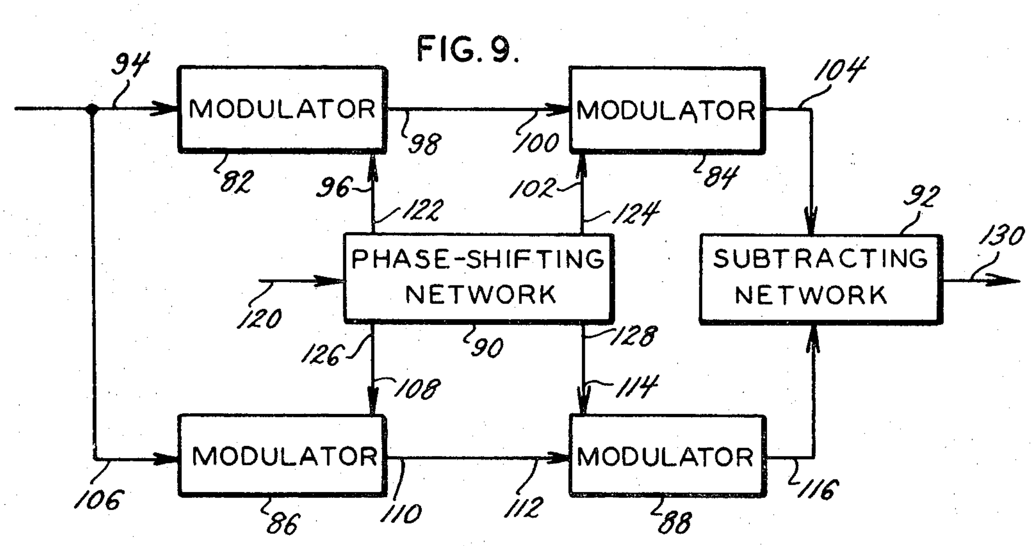
Figures 10, 11:
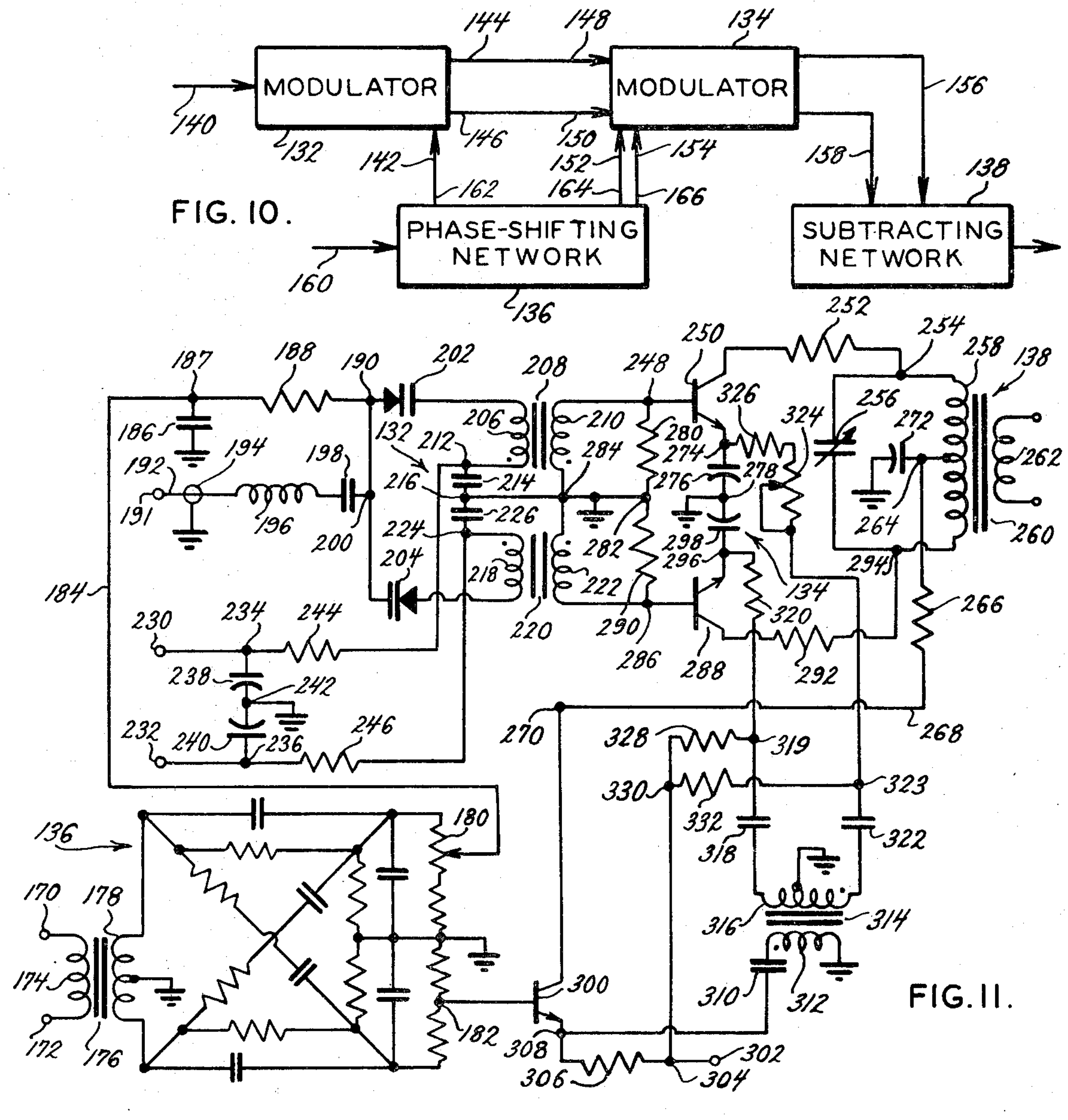
Figure 12:
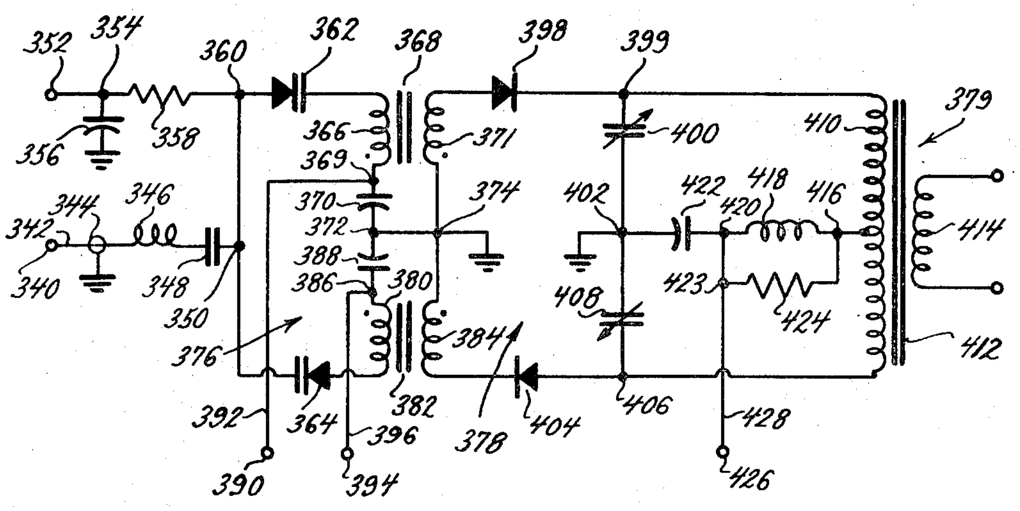
Figure 13:
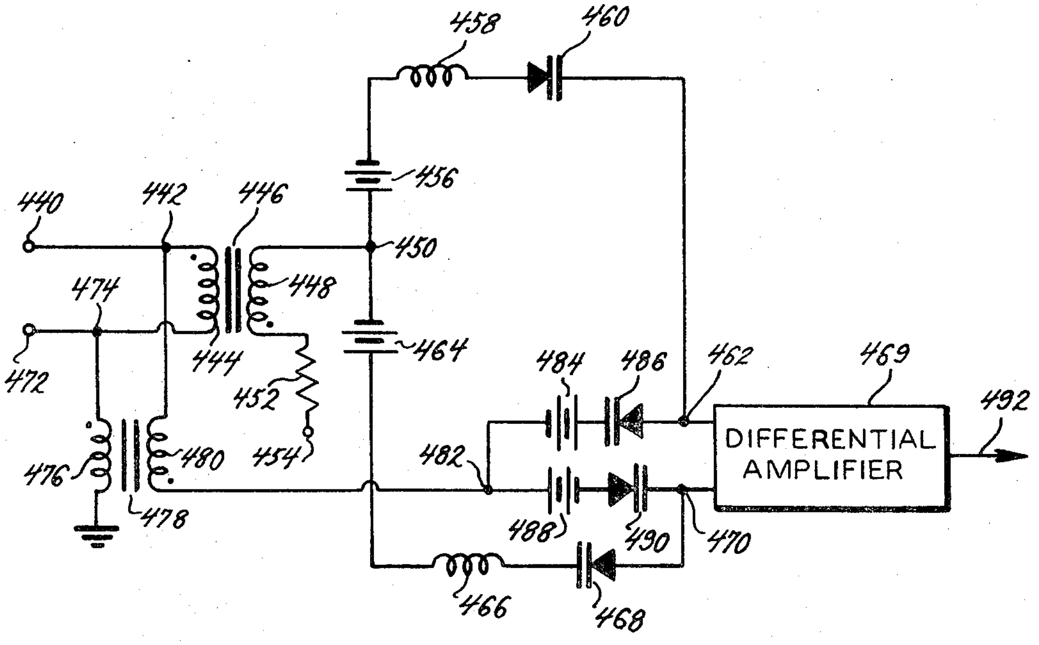

In the drawing:

FIG. 1 shows a phasor representing a carrier signal,

FIG. 2 is a phasor diagram representing amplitude modulation of the carrier signal of FIG. 1, FIG. 3 is a phasor diagram representing phase modulation of the carrier signal of FIG. 1, FIG. 4 is a phasor diagram representing a modulation axis and resultant phasors developed by one modulator provided by the present invention, FIG. 5 is a phasor diagram which is similar to the phasor diagram of FIG. 4 but which includes sidebands on opposite sides of the modulation axis of FIG. 4, FIG. 6 is a phasor diagram representing a second modulation axis and resultant phasors developed by a second modulator provided by the present invention, FIG. 7 is a phasor diagram which is similar to the phasor diagram of FIG. 6 but which includes sidebands on opposite sides of the modulation axis of FIG. 6, FIG. 8 is a block diagram of a control system which can develop a single sideband signal, FIG. 9 is a block diagram of a control system which can develop a single sideband suppressed-carrier signal, FIG. 10 is a block diagram of another control system which can develop a single sideband suppressed-carrier signal, FIG. 11 is a schematic diagram of one preferred embodiment of the control system shown in block form in FIG. 10, FIG. 12 is a schematic diagram of another preferred embodiment of control system that can provide a single sideband suppressed-carrier signal, and FIG. 13 is a circuit diagram of still another preferred embodiment of control system that can provide a single sideband suppressed-carrier signal.

MODULATION THEORY

Referring to the drawing in detail, the numeral 20 denotes a phasor which represents a carrier signal of a given frequency and phase. When that carrier signal is amplitude-modulated by a modulating signal of a lesser frequency, the amplitude of the phasor 20 in FIG. 2 will alternately decrease to the length indicated by the arrowhead 22 and increase to the length indicated by the arrowhead 24. However, the angle of that phasor will be unaffected by that amplitude modulation. When the carrier signal represented by the phasor 20 is phase-modulated by a modulating signal of lesser frequency, the phasor 20 of FIG. 3 will recurrently rotate to and through the dotted-line positions 26 and 28. As a result, the tip of the phasor 20 will move along the arcuate line shown in FIG. 3 if the carrier signal is phase modulated.

In the control system provided by the present invention, it is desirable that two modulation axes be developed that are substantially straight and that are displaced from each other by a predetermined angle. FIGS. 4 and 5 show a modulation axis 30 that is produced by modulating the carrier signal in a given modulator, and that modulation axis is straight. As shown by FIG. 4, the tips of all resultant phasors, such as the resultant phasors 32 and 34, produced by that modulator will lie on that modulation axis. FIGS. 6 and 7 show a second modulation axis 44 that is produced by modulating that carrier signal in a second modulator; and that second modulation axis also is straight. As shown by FIG. 6, the tips of all resultant phasors, such as the resultant phasors 46 and 48, produced by that second modulator will lie on that second modulation axis. The modulation axis 30 of FIGS. 4 and 5 is displaced from the phasor 20, that represents the carrier signal, by an angle A; and the second modulation axis 44 of FIGS. 6 and 7 is displaced from the modulation axis 30 of FIGS. 4 and 5 by the sum of angle A and an angle B. In one preferred embodiment of control system provided by the present invention, the sum of angles A and B is ninety degrees.

As the carrier signal represented by the phasor 20 is modulated to develop the modulation axis 30 of FIGS. 4 and 5, an upper sideband and a lower sideband will be developed; and that upper sideband can be represented by the phasor 36 while that lower sideband can be represented by the phasor 38. That upper sideband and that lower sideband will have the same amplitude, but they will be oppositely-disposed of the modulation axis 30; and the phasor 36 will be rotating in the counter clockwise direction while the phasor 38 will be rotating in the clockwise direction. This means that the angles subtended by those phasors and the modulation axis 30 will constantly be changing; but the tip of the phasor 36 will always be spaced from that modulation axis a distance equal to the distance between that modulation axis and the tip of the phasor 38. The numeral 40 denotes a line which has the length and inclination of the phasor 38, and the numeral 42 denotes a line which has the length and inclination of the phasor 36; and hence the tips of those lines represent the phasor sum of the phasors 36 and 38. Those tips will lie on the modulation axis 30 regardless of the angles subtended by the phasors 36 and 38 and that modulation axis; and that modulation axis will always coact with the phasor 20 or an extension thereof to subtend the angle A.

As the carrier signal represented by the phasor 20 is modulated to develop the modulation axis 44 of FIGS. 6 and 7 and upper sideband and a lower sideband will be developed; and that upper sideband can be represented by the phasor 50 while that lower sideband can be represented by the phasor 52. That upper sideband and lower sideband will have the same amplitude, but they will be oppositely-disposed of the modulation axis 44; and the phasor 50 will be rotating in the counter clockwise direction while the phasor 52 will be rotating in the clockwise direction. This means that the angles subtended by those phasors and the modulation axis 44 will constantly be changing; but the tip of the phasor 50 will always be spaced from that modulation axis a distance equal to the distance between that modulation axis and the tip of the phasor 52. The number 54 denotes a line which has the length and inclination of the phasor 50, and the numeral 56 denotes a line which has the length and inclination of the phasor 52; and hence the tips of those lines represent the phasor sum of the phasors 50 and 52. Those tips will lie on the modulation axis 44 regardless of the angles subtended by the phasors 50 and 52 and that modulation axis; and that modulation axis will always coact with the phasor 20 or an extension thereof to subtend the angle B.

CONTROL SYSTEM OF FIG. 8

Referring particularly to FIG. 8, the numeral 58 denotes a modulator which has a first input 64, a second input 66, and an output 68. When a carrier signal is applied to the input 64 and a modulating signal is applied to the input 66, that modulator will develop a modulated signal at the output 68 thereof which has a modulation axis comparable to the modulation axis 30 of FIGS. 4 and 5. Sidebands, such as the sidebands represented by the phasors 36 and 38 in FIG. 5, will be developed by the modulator; and those sidebands will be oppositely-disposed of the modulation axis 30.

The numeral 60 denotes a second modulator which has an input 70 connected to the output 68 of the modulator 58, a second input 72, and an output 74. That modulator will respond to a carrier signal applied to the input 70 thereof and to a modulating signal applied to the input 72 thereof to develop a modulated signal at the output 74 thereof which has a modulation axis comparable to the modulation axis 44. Sidebands, such as the sidebands represented by the phasors 50 and 52 in FIG. 7, will be developed by that modulator; and those sidebands will be oppositely-disposed of the modulation axis 44.

The numeral 62 denotes a phase-shifting network which has an input 76, a first output 78, and a second output 80. The first output 78 of that phase-shifting network is connected to the second input 66 of the modulator 58, and the second output 80 of that phase-shifting network is connected to the input 72 of the modulator 60.

If a carrier signal is applied to the input 64 of the modulator 58, if a modulating signal is applied to the input 76 of the phase-shifting network 62, and if that phase-shifting network applies that modulating signal in substantially un-shifted form to the output 78 thereof—and thus to the input 66 of the modulator 58—that modulator will develop a modulated carrier signal which has a modulation axis comparable to the modulation axis 30 of FIGS. 4 and 5. That modulated carrier signal will have upper and lower sidebands which are comparable to the upper and lower sidebands represented by the phasors 36 and 38 in FIG. 5. The modulated carrier signal at the output 68 of the modulator 58 will be applied to the input 70 of the modulator 60; and the phase-shifting network 62 will apply a phase-shifted modulating signal to the output 80 thereof, and thus to the input 72 of the modulator 60. That modulator will use the phase-shifted modulating signal to modulate the carrier signal from the modulator 58 to develop a modulated carrier signal which has a modulation axis comparable to the modulation axis 44 in FIGS. 6 and 7. That modulated carrier signal will have upper and lower sidebands comparable to the upper and lower sidebands represented by the phasors 50 and 52 in FIG. 7. The amplitude of the upper sideband developed by the modulator 60 will be equal to the amplitude of the upper sideband developed by the modulator 58 when those upper sidebands appear at the output 74 of the modulator 60; and, similarly, the amplitude of the lower sideband developed by the modulator 60 will be equal to the amplitude of the lower sideband developed by the modulator 58 when those lower sidebands appear at the output 74.

In one preferred embodiment of the control system shown by FIG. 8, the modulator 58 provides an angle A of ninety degrees between the modulation axis 30 and the extension of the phasor 20 in FIGS. 4 and 5; and the modulator 60 develops an angle B of zero degrees between the modulation axis 44 and the extension of the phasor 20. Further, in the said embodiment of control system, the phase-shifting network 62 provides a phase shift of ninety degrees between the modulating signal at the output 78 thereof—and hence at the input 66 of the modulator 58—and the phase-shifted modulating signal at the output 80 thereof—and hence at the input 72 of the modulator 60. Where that is done, the modulation axis 44 in FIGS. 6 and 7 will be displaced ninety degrees from the modulation axis 30 in FIGS. 4 and 5, the sum of the angle between the phasor 50 and the modulation axis 44 and the angle between the phasor 36 and the modulation axis 30 will be ninety degrees, and the sum of the angle between the phasor 38 and the modulation axis 30 and the angle between the phasor 52 and the modulation axis 44 will be ninety degrees. As shown by FIGS. 5 and 7, the phasor 50 is displaced one hundred and eighty degrees from the phasor 36; and, hence the upper sidebands represented by those phasors will directly buck and cancel each other. Also as shown by FIGS. 5 and 7, the phasor 52 and the phasor 38 are directly in phase and will aid and reinforce each other. All of this means that the modulators 58 and 60 and the phase-shifting network 62 of FIG. 8 will develop upper sidebands represented by the phasors 36 and 50 which will buck and cancel each other, and also will develop lower sidebands represented by the phasors 38 and 52 which will aid and reinforce each other.

In developing a modulation axis, such as the modulation axis 30 in FIGS. 4 and 5, which is angularly displaced from the carrier signal phasor 20, the modulator 58 of FIG. 8 provides a modulation that differs from amplitude-modulation and also differs from phase-modulation. Specifically, that modulation differs from amplitude-modulation because the resulting modulation axis is angularly displaced from the carrier signal; and that modulation differs from phase-modulation because the amplitudes of the resultant phasors change. The modulation provided by the modulator 58 of FIG. 8 can be described as compound modulation; and it provides a modulation axis which is angularly displaced from the carrier signal, which is generally linear, and which contains the phasor sum of the upper and lower sidebands developed by that modulation.

The input 70 of the modulator 60 in FIG. 8 does not receive a pure carrier signal but, instead, receives a modulated carrier signal which has upper and lower sidebands represented by the phasors 36 and 38; and the phase-shifted modulating signal applied to the input 72 of that modulator will modulate those sidebands as well as the carrier signal. Consequently, the output 74 of the modulator 60 will not only include a reinforced lower sideband corresponding to the phasors 38 and 52 but also will include the carrier signal applied to the input 64 of the modulator 58 plus a number of spurious sidebands. As a result, the control system shown by FIG. 8 should be recognized as being intended primarily to illustrate just part of the process of developing a single sideband suppressed-carrier signal.

CONTROL SYSTEM OF FIG. 9

Referring to FIG. 9, the numeral 82 denotes a modulator which is comparable to the modulator 58 of FIG. 8; and the numeral 84 denotes a modulator which is comparable to the modulator 60 of FIG. 8. The numeral 86 denotes a modulator which is generally similar to the modulator 82, but which provides sidebands that are displaced one hundred and eighty degrees from the sidebands developed by the modulator 82. Specifically, each of the modulators 82 and 86 will develop a modulation axis, such as the modulation axis 30 in FIGS. 4 and 5, and those modulation axes will have the same inclinations; but the sidebands developed by the modulator 86 will be displaced one hundred and eighty degrees from the sidebands developed by the modulator 82. The numeral 88 denotes a modulator which is generally similar to the modulator 84, but which provides sidebands that are displaced one hundred and eighty degrees from the sidebands developed by the modulator 84. Specifically, each of the modulators 84 and 88 will develop a modulation axis comparable to the modulation axis 44 in FIGS. 6 and 7, and those modulation axis will have the same inclinations; but the sidebands developed by the modulator 88 will be displaced one hundred and eighty degrees from the sidebands developed by the modulator 84. The phase-shifting network 90 of FIG. 9 can be similar to the phase-shifting network 62 of FIG. 8, but it will have four outputs rather than just two outputs. A subtracting network 92 is connected to the outputs of the modulators 84 and 88.

In the operation of the control system shown by FIG. 9, a carrier signal will be applied to the inputs 94 and 106, respectively, of the modulators 82 and 86; and a modulating signal will be applied to the input 120 of the phase-shifting network 90. That modulating signal will appear at the output terminal 122 of that phase-shifting network, and will thus appear at the input 96 of the modulator 82. That modulating signal will be phase-shifted and will appear at the output 124 of that phase-shifting network, and will thus appear at the input 102 of the modulator 84. The modulating signal which appears at the output 126 of the phase-shifting network 90 will be equal in amplitude to, but will be one hundred and eighty degrees out of phase with, the modulating signal which appears at the output 122 of that phase-shifting network; and, similarly, the modulating signal which appears at the output 128 of the phase-shifting network 90 will be equal in amplitude to, but will be one hundred and eighty degrees out of phase with, the modulating signal which appears at the output 124 of the phase-shifting network. The modulator 82 will respond to the carrier signal applied to the input 94 thereof and to the modulating signal applied to the input 96 thereof to develop an upper sideband and a lower sideband which are oppositely-disposed of the modulation axis developed by that modulator. As a result, the output 98 of that modulator will "see" an upper sideband represented by the phasor 36, the carrier signal represented by the phasor 20, and a lower sideband represented by the phasor 38. The modulator 86 will respond to the carrier signal applied to the input 106 thereof and to the one hundred and eighty degree shifted modulating signal applied to the input 108 thereof to develop an upper sideband and a lower sideband which are oppositely-disposed of the modulation axis developed by that modulator. As a result, the output 110 of the modulator will "see" an upper sideband represented by the phasor 37 in FIG. 5, the carrier signal represented by the phasor 20, and a lower sideband represented by the phasor 39 in FIG. 5. The upper sideband developed by the modulator 86 will be displaced one hundred and eighty degrees from the upper sideband developed by the modulator 82; and both of those upper sidebands will be rotating at the same angular speed in the counter clockwise direction. The lower sideband developed by the modulator 86 will be displaced one hundred and eighty degrees from the lower sideband developed by the modulator 82; and both of those lower sidebands will be rotating at the same angular speed in the clockwise direction.

The modulator 84 will respond to the carrier signal applied to the input 100 thereof and to the phase-shifted modulating signal applied to the input 102 thereof to develop an upper sideband and a lower sideband which are oppositely-disposed of the modulation axis developed by that modulator. The amplitude of that upper sideband will be equal to the amplitude of the upper sideband developed by the modulator 82 when those upper sidebands appear at the output 104 of the modulator 84; and the amplitude of that lower sideband will be equal to the amplitude of the lower sideband developed by the modulator 82 when those lower sidebands appear at that output. The upper sideband developed by the modulator 84 can be represented by the phasor 50 in FIG. 7, and that sideband will be one hundred and eighty degrees out of phase with the upper sideband which is developed by the modulator 82 and which is represented by the phasor 36 in FIG. 5; and hence those upper sidebands will buck and cancel each other. The lower sideband developed by the modulator 84 can be represented by the phasor 52 in FIG. 7, and that sideband will be in phase with the lower sideband which is developed by the modulator 82 and which is represented by the phasor 38 in FIG. 5; and hence those lower sidebands will aid and reinforce each other. As a result, the output 104 of the modulator 84 will "see" a reinforced lower sideband. That output also will "see" the original carrier signal plus a number of spurious sidebands; because the phase-shifted modulating signal that is applied to the input 102 of that modulator will modulate the upper sideband and the lower sideband as well as the carrier signal applied to the input 100 of that modulator.

The modulator 88 will respond to the carrier signal applied to the input 112 thereof and to the phase-shifted modulating signal applied to the input 114 thereof to develop an upper sideband and a lower sideband which are oppositely-disposed of the modulation axis developed by that modulator. The amplitude of that upper sideband will be equal to the amplitude of the upper sideband developed by the modulator 86 when those upper sidebands appear at the output 116 of the modulator 88; and the amplitude of that lower sideband will be equal to the amplitude of the lower sideband developed by the modulator 86 when those lower sidebands appear at that output. The upper sideband developed by the modulator 88 can be represented by the phasor 51 in FIG. 7, and that sideband will be one hundred and eighty degrees out of phase with the upper sideband which is developed by the modulator 86 and which is represented by the phasor 37 in FIG. 5; and hence those upper sidebands will buck and cancel each other. The lower sideband developed by the modulator 88 can be represented by the phasor 53 in FIG. 7, and that sideband will be in phase with the lower sideband which is developed by the modulator 86 and which is represented by the phasor 39 in FIG. 5; and hence those lower sidebands will aid and reinforce each other. As a result, the output 116 of the modulator 88 will "see" a reinforced lower sideband. That output also will "see" the original carrier signal plus a number of spurious sidebands; because the phase-shifted modulating signal that is applied to the input 114 of that modulator will modulate the upper sideband and the lower sideband as well as the carrier signal applied to the input 112 of that modulator.

The signals at the output 104 of the modulator 84 and the signals at the output 116 of the modulator 88 will be applied to the subtracting network 92; and that network will cause the carrier signal and the spurious sidebands "seen" by the output 104 of the modulator 84 to buck and cancel the carrier signal and the spurious sidebands "seen" by the output 116 of the modulator 88. The reinforced lower sideband "seen" by the output 104 of the modulator 84 will be combined with the oppositely-polarized reinforced lower sideband "seen" by the output 116 of the modulator 88; and hence, the output 130 of the subtracting network 92 will have a doubly-reinforced lower sideband, will be free of the carrier signal applied to the modulators 82 and 86, will have no upper sideband, and will be free of spurious sidebands. As a result, the control system shown by FIG. 9 can produce a theoretically-perfect, single sideband suppressed-carrier signal.

CONTROL SYSTEM OF FIG. 10

In actual practice, it is easier and less expensive to combine the modulators 82 and 86 into one modulator, and it is easier and less expensive to combine the modulators 84 and 88 into one modulator. Referring to FIG. 10, the numeral 132 denotes a modulator which is intended to perform the functions of both of the modulators 82 and 86 of FIG. 9; and, similarly, the numeral 134 denotes a modulator which is intended to perform the functions of both of the modulators 84 and 88 of FIG. 9. The numeral 136 denotes a phase-shifting network which is generally similar to the phase-shifting network 90 of FIG. 9; and the numeral 138 denotes a subtracting network that is comparable to the subtracting network 92 of FIG. 9. A carrier signal will be applied to the input 140 of the modulator 132, and a modulating signal will be applied to the input 160 of the phase-shifting network 136. That modulating signal will appear, with a zero or a finite shift in phase, at the output 162 of that phase-shifting network, and hence at the input 142 of the modulator 132. That modulating signal will be shifted about ninety degrees in phase with respect to the modulating signal at the output 162 and will then appear at the output 164 of that phase-shifting network, and hence at the input 152 of the modulator 134; and that modulating signal will be shifted two hundred and seventy degrees in phase with respect to the modulating signal at the output 162 and will then appear at the output 166 of that phase-shifing network, and hence at the input 154 of the modulator 134.

The modulator 132 will respond to the carrier signal applied to the input 140 thereof and to the un-shifted modulating signal applied to the input 142 thereof to develop an upper side-band represented by the phasor 36 in FIG. 5, a lower sideband represented by the phasor 38, a second upper sideband represented by the phasor 37, and a second lower sideband represented by the phasor 39. The carrier signal and the sidebands represented by the phasors 36 and 38 in FIG. 5 will appear at the output 144 of the modulator 132, and thus will be applied to the input 148 of the modulator 134; and that carrier signal and the sidebands represented by the phasors 37 and 39 will appear at the output 146 of the modulator 132, and thus will be applied to the input 150 of the modulator 134.

The modulator 134 will use that portion of the modulating signal which has been shifted ninety degrees to modulate the carrier signal; and the resulting modulation will develop an upper sideband represented by the phasor 50 in FIG. 7 and a lower sideband represented by the phasor 52. Those sidebands will have amplitudes equal to those of the sidebands "seen" by the output 144 of the modulator 132 when those various sidebands appear at the output 156 of the modulator 134; and the sideband represented by the phasor 50 will be one hundred and eighty degrees out of phase with the sideband represented by the phasor 36, while the sideband represented by the phasor 52 will be in phase with the sideband represented by the phasor 38. As a result, the sideband represented by the phasor 50 and the sideband represented by the phasor 36 will buck and cancel each other; while the sideband represented by the phasor 52 and the sideband represented by the phasor 38 will aid and reinforce each other, and the resulting reinforced sideband will appear at the output 156 of the modulator 134 and will be applied to one input of the subtracting network 138.

The modulator 134 will use that portion of the modulating signal which has been shifted two hundred and seventy degrees to modulate the carrier signal; and the resulting modulation will develop an upper sideband represented by the phasor 51 in FIG. 7 and a lower sideband represented by the phasor 53. Those sidebands will have amplitudes equal to those of the sidebands "seen" by the output 146 of the modulator 132 when those various sidebands appear at the output 158 of the modulator 134; and the sideband represented by the phasor 51 will be one hundred and eighty degrees out of phase with the sideband represented by the phasor 37, while the sideband represented by the phasor 53 will be in phase with the sideband represented by the phasor 39. As a result, the sideband represented by the phasor 51 and the sideband represented by the phasor 37 will buck and cancel each other; while the sideband represented by the phasor 53 and the sideband represented by the phasor 39 will aid and reinforce each other, and the resulting reinforced sideband will appear at the output 158 of the modulator 132 and will be applied to one input of the subtracting network 138. It will be noted that the reinforced sidebands represented by the phasors 38 and 52 are displaced one hundred and eighty degrees from the reinforced sidebands represented by the phasors 39 and 53.

The output 156 of the modulator 134 will "see" the carrier signal plus spurious sidebands which were developed as that portion of the modulating signal which was shifted ninety degrees modulated the sidebands which are represented by the phasors 36 and 38 in FIG. 5. Similarly, the output 158 of that modulator will "see" the carrier signal plus spurious sidebands which were developed as that portion of the modulating signal which was phase-shifted two hundred and seventy degrees modulated the sidebands which are represented by the phasors 37 and 39 in FIG. 5. The carrier signal and the spurious sidebands "seen" by the output 156 will be in phase with the carrier signal and the spurious sidebands "seen" by the output 158; and hence the subtracting network 138 will cause those carrier signals and those sidebands to cancel each other. However, because the reinforced sidebands represented by the phasors 38 and 52 are displaced one hundred and eighty degrees from the reinforced sidebands represented by the phasors 39 and 53, the subtracting network 138 will cause those reinforced sidebands to additionally reinforce each other. The overall result is that the control system of FIG. 10 can produce a theoretically perfect, single sideband suppressed-carrier signal wherein the single sideband is doubly reinforced.

CONTROL SYSTEM OF FIG. 11

Referring to FIG. 11, the numerals 170 and 172 denote terminals that are connectable to a source of a suitable modulating signal; and, in the preferred embodiment of control system shown in FIG. 11, that modulating signal is a single frequency signal having a frequency of one and one-half kilocycles per second. The numeral 174 denotes the primary winding of a transformer 176; and that transformer has a center-tapped secondary winding 178. The upper and lower terminals of that secondary winding are connected to the input terminals of an audio phase-shifting network 136. While different audio phase-shifting networks could be used, the audio phase-shifting network that is shown on page 289 of the Thirty-second edition of The Radio Amateur's Handbook which was published in 1955 by the American Radio Relay League of West Hartford, Connecticut, has been found to be very useful. That audio phase-shifting network includes a potentiometer 180, and also includes a junction 182. A conductor 184, a junction 187, and a resistor 188 connect the movable contact of the potentiometer 180 to a junction 190; and a capacitor 186 and the junction 187 connect that conductor to ground. That capacitor and that resistor will coact to by-pass to ground any noise, transients, and high frequency signals. The numeral 191 denotes a terminal which is connectable to a source of a carrier signal; and, in the preferred embodiment of control system shown in FIG. 11, that carrier signal is a single frequency signal which has a frequency of fourteen megacycles per second. A conductor 192, an inductor 196, and a capacitor 198 couple the terminal 191 to a junction 200, and thus to the junction 190. The conductor 192 preferably has shielding 194 thereon which is connected to ground.

The junctions 190 and 200 constitute input terminals for a modulator 132; and that modulator includes a varactor 202 which has the anode thereof connected to the junction 190 and which has the cathode thereof connected to the upper terminal of the primary winding 206 of a transformer 208. A junction 212 connects the lower terminal of the primary winding 206 to one terminal of a capacitor 214; and junctions 216 and 284 connect the other terminal of that capacitor to ground. That modulator also includes a varactor 204 which has the cathode thereof connected to the junction 200 and has the anode thereof connected to the lower terminal of the primary winding 218 of a transformer 220. A junction 224 connects the upper terminal of that primary winding to one terminal of a capacitor 226, and the junctions 216 and 284 connect the other terminal of that capacitor to ground. The varactors 202 and 204 act as voltage-controlled capacitors; and the varactor 202 coacts with the primary winding 206 and the capacitor 214 to constitute a series-resonant circuit that resonates at the fourteen megacycle frequency of the carrier signal. Similarly, the varactor 204 coacts with the primary winding 218 and the capacitor 226 to constitute a series-resonant circuit that resonates at the fourteen megacycle frequency of the carrier signal.

The numerals 230 and 232 denotes terminals which are connectable to a source of regulated D.C.; and, in the preferred embodiment of control system shown by FIG. 11, that source of regulated D.C. applies positive eight volts to the terminal 230 and applies negative eight volts to the terminal 232. A junction 234 and a resistor 244 connect the terminal 230 to the junction 212; and a junction 236 and a resistor 246 connect the terminal 232 to the junction 224. The resulting application of a positive voltage to the cathode of the varactor 202 will reverse bias that varactor; and the resulting application of a negative voltage to the anode of the varactor 204 will reverse bias that varactor. The capacitor 214 will de-couple the D.C. at the junction 212 from ground; and, similarly, the capacitor 216 will de-couple the D.C. at the junction 224 from ground. Capacitors 238 and 240 are connected in series between the junctions 234 and 236, and a junction 242 between those capacitors is connected to ground. Those capacitors will by-pass to ground any noise, transients, or A.C. signals that reach the junctions 234 and 236.

The transformer 208 has a secondary winding 210; and the upper terminal of that secondary winding is connected to the base of an NPN transistor 250 by a junction 248. A resistor 280 and a junction 282 connect the junction 248 to ground; and a junction 274 connects the emitter of that transistor to the upper terminal of a capacitor 276 while the lower terminal of that capacitor is connected to ground by a junction 278. A resistor 252, a junction 254, the upper section of a center-tapped primary winding 258 of a transformer 260, a junction 264, a resistor 266, and a conductor 268 connect the collector of that transistor to a terminal 270, which can be connected to a source of regulated positive D.C. voltage. In the preferred embodiment of control system shown in FIG. 11, that terminal can be connected to a source of positive ten volts.

The transformer 220 has a secondary winding 222; and the upper terminal of that secondary winding is connected to ground by the junction 284. The lower terminal of that secondary winding is connected to the base of an NPN transistor 288 by a junction 286. A resistor 290 and the junction 282 connect the junction 286 to ground; and a junction 296 connects the emitter of the transistor 288 to the lower terminal of a capacitor 298 while the upper terminal of that capacitor is connected to ground by the junction 278. A resistor 292, a junction 294, the lower section of the center-tapped primary winding 258 of the transformer 260, the junction 264, the resistor 266, and the conductor 268 connect the collector of the transistor 288 to the terminal 270, and thus to positive ten volts. The transistors 250 and 288, the resistors 280 and 290, the resistors 252 and 292, and the capacitors 276 and 298 constitute a modulator 134.

An adjustable capacitor 256 is connected between the junctions 254 and 294, and thus is connected in parallel with the center-tapped primary winding 258 of the transformer 260. That adjustable capacitor and that primary winding constitute a parallel-resonant circuit which is intended to resonate at the frequency or at a harmonic of the frequency of the single sideband suppressed-carrier signal to be developed by the control system shown in FIG. 11; but, because that frequency is so very close to the fourteen megacycle frequency of the carrier signal, that parallel-resonant circuit will resonate at fourteen magacycles or at any sideband frequencies close to fourteen megacycles. The secondary winding 262 of the transformer 260 will have the terminals thereof connectable to a suitable load, as for example a driver stage or an antenna. A capacitor 272 is connected between the junction 264 and ground; and that capacitor will coact with the resistor 266 to keep noise, transients and A.C. signals from passing to the terminal 270. The adjustable capacitor 256, the primary winding 258, and the secondary winding 262 constitute a subtracting network 138.

The numeral 300 denotes an NPN transistor which has the base thereof connected to the junction 182 of the phase-shifting network 136; and the collector of that transistor is connected to the terminal 270, and thus to positive ten volts. A junction 308, a resistor 306, and a juntcion 304 connect the emitter of that transistor to a terminal 302 which is connectable to a source of requlated negative D.C. voltage. In the preferred embodiment of control system shown in FIG. 11, that terminal is connectable to a source of negative fifteen volts. The junction 308 and a capacitor 310 couple the emitter of the transistor 300 to the primary winding 312 of a transformer 314; and that transformer has a center-tapped secondary winding 316. The center-tap of that secondary winding is connected to ground; and a capacitor 318, a junction 319 and a resistor 320 connect the left-hand terminal of that secondary winding to the junction 296, while a capacitor 322, a junction 323, an adjustable resistor 324, and a resistor 326 connect the right-hand terminal of that secondary winding to the junction 274. A resistor 328 is connected between the junctions 319 and 304 by a junction 330; and, similarly, a resistor 332 is connected between the junctions 323 and the junction 304 by the junction 330.

The modulator 132 can respond to a carrier signal and to a modulating signal to develop a modulation axis represented by the modulation axis 30 shown in FIGS. 4 and 5; and the modulator 134 can respond to that carrier signal and to a modulating signal to develop a modulation axis represented by the modulation axis 44 shown in FIGS. 6 and 7. In the preferred embodiment of control system shown in FIG. 11, the angle A in FIGS. 4 and 5 will be ninety degrees, and the angle B in FIGS. 6 and 7 will be zero. As a result, the modulation axis 44 developed by the modulator 134 in FIG. 11 will be displaced ninety degrees from the modulation axis 30 developed by the modulator 132 in FIG. 11.

The modulating signal applied to the terminals 170 and 172 will be applied to the input of the phase-shifting network 136 by the transformer 176; and one portion of that modulating signal will appear at the movable contact of the potentiometer 180 while another portion of that modulating signal will appear at the junction 182 of that phase-shifting network. The portion of the moduating signal which appears at the junction 182 will be shifted ninety degrees from that portion of that modulating signal which appears at the movable contact of the potentiometer 180. As a result, the movable contact of the potentiometer 180 will correspond to the output 162 of the phase-shifting network 136 in FIG. 10, and the junction 187 will correspond to the input 142 of the modulator 132 in FIG. 10. The right-hand terminal of the secondary winding 316 of the transformer 314 in FIG. 11 will correspond to the output 164 of the phase-shifting network 136 in FIG. 10, and the left-hand terminal of that secondary winding will correspond to the output 166 of that phase-shifting network in FIG. 10.

The modulating signal from the movable contact of the potentiometer 180 will be applied by conductor 184, junction 187, and resistor 188 to the junctions 190 and 200, and thus to the varactors 202 and 204. That modulating signal will shift the capacitances of those two varactors in opposite directions, because that modulating signal will be applied to the anode of the varactor 202 and to the cathode of the varactor 204. The series-resonant circuit constituted by the varactor 202, the primary winding 206, and the capacitor 214 will respond to the resulting shifting of the capacitance of that varactor to develop upper and lower sidebands represented, respectively, by the phasors 36 and 38 in FIG. 5. The series-resonant circuit constituted by the varactor 204, the primary winding 218, and the capacitor 226 will respond to the resulting shifting of the capacitance of that varactor to develop upper and lower sidebands represented, respectively, by the phasors 37 and 39 in FIG. 5. The phasor 37 constitutes a backward extension of the phasor 36, while the phasor 39 constitutes a backward extension of the phasor 38; and the amplitudes of all of the phasors 36, 37, 38 and 39 are equal. This means that the upper section of the modulator 132 has responded to the carrier signal applied to the terminal 191 and to the modulating signal applied to the junctions 190 and 200 to develop an upper sideband and a lower sideband, and that the lower section of that modulator has responded to that carrier signal to develop an upper sideband and a lower sideband which are displaced one hundred and eighty degrees, respectively, from the upper and lower sidebands developed by that upper section. The transformer 208 will couple the carrier signal plus the sidebands represented by the phasors 36 and 38 of FIG. 5 to the upper section of the modulator 134; and the transformer 220 will couple that carrier signal plus the sidebands represented by the phasors 37 and 39 in FIG. 5 to the lower section of that modulator.

The portion of the modulating signal, which appears at the junction 182 of the phase-shifting network 136 and which has been displaced ninety degrees from that portion of the modulating signal which appears at the movable contact of the potentiometer 180 of that phase-shifting network, will be applied to the base of the transistor 300; and that portion of that modulating signal will vary the conductivity of that transistor. That transistor is connected as an emitter follower stage, and hence the voltage at the junction 308 will vary in phase with that portion of the modulating signal which appears at the junction 182. The varying voltage at the junction 308 will vary the current flowing through the primary winding 312 of the transformer 314; and, as a result, varying voltages will develop at the left-hand and right-hand terminals of the secondary winding 316 of that transformer. The varying voltage at the right-hand terminal will be in phase with the voltage at the junction 182, and thus will constitute a modulating signal which is displaced ninety degrees from that portion of the modulating signal which appears at the movable contact of the potentiometer 180. The varying voltage at that left-hand terminal will be one hundred and eighty degrees out of phase with the voltage at the junction 182, and thus will constitute a modulating signal which is displaced two hundred and seventy degrees from that portion of the modulating signal which appears at the movable contact of the potentiometer 180.

The capacitor 322, the junction 323, the adjustable resistor 324, and the resistor 326 will couple the varying voltage at the right-hand terminal of the secondary winding 316 to the emitter of the transistor 250; and that varying voltage will vary the emitter current and hence the transconductance of that transistor at the frequency of the modulating signal. The secondary winding 210 of the transformer 208 will apply the carrier signal and the upper and lower sidebands from the upper section of the modulator 132 of FIG. 11 to the base of the transistor 250, and will thus vary the conductivity of that transistor at the frequency of that carrier signal at the frequencies of those sidebands. Current will flow from terminal 270 via conductor 268, resistor 266, junction 264, the upper section of center-tapped primary winding 258, junction 254, resistor 252, the collector-emitter circuit of transistor 250, junction 274, resistor 326, adjustable resistor 324, junction 323, resistor 332, junction 330, and junction 304 to the terminal 302; and the variations in conductivity of that transistor due to the application of the carrier signal to the base thereof and due to the application of the modulating signal to the emitter thereof will vary the amount of current flowing through the upper section of that primary winding. The resulting variations in that current will represent modulations of the carrier signal and of the sidebands represented by the phasors 36 and 38 in FIG. 5 by that portion of the modulating signal which appears at the right-hand terminal of the secondary winding 316, and which is displaced ninety degrees from that portion of the modulating signal which appears at the movable contact of the potentiometer 180.

The capacitor 318, the junction 319, and the resistor 320 will couple the varying voltage at the left-hand terminal of the secondary winding 316 to the emitter of the transistor 288; and that varying voltage will vary the emitter current and hence the transconductance of that transistor at the frequency of the modulating signal. The secondary winding 222 of the transformer 220 will apply the carrier signal and the upper and lower sidebands from the lower section of the modulator 132 of FIG. 11 to the base of the transistor 288, and will thus vary the conductivity of that transistor at the frequency of that carrier signal and at the frequencies of those sidebands. Current will flow from terminal 270 via conductor 268, resistor 266, junction 264, the lower section of center-tapped primary winding 258, junction 294, resistor 292, the collector-emitter circuit of transistor 288, junction 296, resistor 320, junction 319, resistor 382, junction 330, and junction 304 to the terminal 302; and the variations in the conductivity of that transistor due to the application of the carrier signal to the base thereof and due to the application of the modulating signal to the emitter thereof will vary the amount of current flowing through the lower section of that primary winding. The resulting variations in that current will represent modulations of the carrier signal and of the sidebands represented by the phasors 37 and 39 of FIG. 5 by that portion of the modulating signal which appears at the left-hand terminal of the secondary winding 316, and which is displaced two hundred and seventy degrees from that portion of the modulating signal which appears at the movable contact of the potentiometer 180.

The modulation of the carrier signal, by that portion of the modulating signal which is applied to the emitter of the transistor 250, will develop an upper sideband represented by the phasor 50 in FIG. 7; and the amplitude of that sideband will equal the amplitude of the upper sideband developed by the upper section of the modulator 132 in FIG. 11 and represented by the phasor 36 in FIG. 5. However, the upper sideband represented by the phasor 50 will be displaced one hundred and eighty degrees from the upper sideband represented by the phasor 36; and hence those upper sidebands will buck and cancel each other. The modulation of the carrier signal, by that portion of the modulating signal which is applied to the emitter of the transistor 250, also will develop a lower sideband represented by the phasor 52 in FIG. 7; and the amplitude of that sideband will equal the amplitude of the lower sideband developed by the upper section of the modulator 132 in FIG. 11, and represented by the phasor 38 in FIG. 5, when those lower sidebands appear at the output of the modulator 134. The lower sideband represented by the phasor 52 will be in phase with the lower sideband represented by the phasor 38 in FIG. 5, and hence those lower sidebands will aid and reinforce each other.

The modulation of the carrier signal, by that portion of the modulating signal which is applied to the emitter of the transistor 288, will develop an upper sideband represented by the phasor 51 in FIG. 7; and the amplitude of that sideband will equal the amplitude of the upper sideband developed by the lower section of the modulator 132 in FIG. 11 and represented by the phasor 37. However, the upper sideband represented by the phasor 51 will be displaced one hundred and eighty degrees from the upper sideband represented by the phasor 37 in FIG. 5; and hence those upper sidebands will buck and cancel each other. The modulation of the carrier signal, by that portion of the modulating signal which is applied to the emitter of the transistor 288, also will develop a lower sideband represented by the phasor 53 in FIG. 7; and the amplitude of that sideband will equal the amplitude of the lower sideband developed by the lower section of the modulator 132 in FIG. 11 and represented by the phasor 39, when those lower sidebands appear at the output of the modulator 134. The lower sideband represented by the phasor 53 will be in phase with the lower sideband represented by the phosor 39 in FIG. 5, and hence those lower sidebands will aid and reinforce each other.

The modulation of the carrier signal by the upper section of the modulator 134 in FIG. 11 will thus develop an upper sideband which will buck and canel the upper sideband developed by the upper section of the modulator 132 in FIG. 11; and the modulation of the carrier signal by the lower section of the modulator 134 in FIG. 11 will thus develop an upper sideband which will buck and canel the upper sideband developed by the lower section of the modulator 132 of FIG. 11. The modulation of the carrier signal by the upper section of the modulator 134 in FIG. 11 will thus develop a lower sideband which will aid and reinforce the lower sideband developed by the upper section of the modulator 132 of FIG. 11; and the modulation of the carrier signal by the lower section of the modulator 134 in FIG. 11 will thus develop a lower sideband which will aid and reinforce the lower sideband developed by the lower section of the modulator 132 of FIG. 11. It will be noted, however, that the reinforced lower sideband developed by the lower sections of the modulators 132 and 134 in FIG. 11 and represented by the phasors 39 and 53 in FIGS. 5 and 7 is displaced one hundred and eighty degrees from the reinforced lower sideband developed by the upper sections of the modulators 132 and 134 in FIG. 11 and represented by the phasors 38 and 52 in FIGS. 5 and 7.

The upper sideband represented by the phosor 36 will have a frequency of fourteen million one thousand and five hundred cycles per second; and, when that upper sideband is modulated by the upper section of the modulator 134 of FIG. 11, a spurious upper sideband having a frequency of fourteen million and three thousand cycles per second and a signal having the fourteen megacycle per second frequency of the carrier signal will be produced. Similarly, the upper sideband represented by the phasor 37 will have a frequency of fourteen million one thousand and five hundred cycles per second; and, when that upper sideband is modulated by the lower section of the modulator 134 of FIG. 11, a spurious upper sideband having a frequency of fourteen million and three thousand cycles per second and a signal having the fourteen megacycle per second frequency of the carrier signal will be produced. The upper sideband represented by the phasor 37 will initially be displaced one hundred and eighty degrees from the upper sideband represented by the phasor 36; but the upper sideband represented by the phasor 36 will be displaced ninety degrees by the modulation due to the portion of the modulating signal applied to the emitter of the transistor 250, and the upper sideband represented by the phasor 37 will be displaced two hundred and seventy degrees by the modulation due to the portion of the modulating signal applied to the emitter of the transistor 288. As a result, the spurious upper sidebands will be in phase; and the signals having the fourteen megacycle per second frequency of the carrier signal also will be in phase. The amplitudes of the upper spurious sidebands will be equal; and the amplitudes of the signals having the fourteen megacycle frequency of the carrier signal will be equal.

The lower sideband represented by the phasor 38 will have a frequency of thirteen million, nine hundred and ninety-eight thousand, five hundred cycles per second; and when that lower sideband is modulated by the upper section of the modulator 134 of FIG. 11, a spurious lower sideband having a frequency of fourteen million, nine hundred and ninety-seven thousand cycles per second and a signal having the fourteen megacycle per second frequency of the carrier signal will be produced. Similarly, the lower sideband represented by the phasor 39 will have a frequency of thirteen million, nine hundred and ninety-eight thousand, five hundred cycles per second; and when that lower sideband is modulated by the lower section of the modulator 134 of FIG. 11, a spurious lower sideband having a frequency of fourteen million, nine hundred and ninety-seven thousand cycles per second and a signal having the fourteeen megacycle per second frequency of the carrier signal will be produced. The lower sideband represented by the phasor 39 will initially be displaced one hundred and eighty degrees from the lower sideband represented by the phasor 38; but the lower sideband represented by the phasor 38 will be displaced ninety degrees by the modulation due to the portion of of the modulating signal applied to the emitter of the transistor 250, and the lower sideband represented by the phasor 39 will be displaced two hundred and seventy degrees by the modulation due to the portion of the modulating signal applied to the emitter of the transistor 288. As a result, the spurious lower sidebands will be in phase; and the signals having the fourteen megacycle per second frequency of the carrier signal also will be in phase. The amplitudes of the lower spurious sidebands will be equal; and the amplitudes of the signals having the fourteen megacycle frequency of the carrier signal will be equal.

The currents flowing through the upper section of the primary winding 258 of the subtracting network 138 will develop magnetic fields that will buck and cancel the magnetic fields developed by the currents flowing through the lower section of that primary winding. As a result, the "in phase" spurious upper sidebands, spurious lower sidebands, carrier signal, and signals having the fourteen megacycle frequency of the carrier signal will develop magnetic fields adjacent the upper and lower sections of the primary winding 258 which will buck and cancel each other. However, the reinforced lower sidebands which are represented by the phasors 38 and 52 and by the phasors 39 and 53 and which are one hundred and eighty degrees out of phase will develop magnetic fields adjacent the upper and lower sections of the primary winding 258 which will aid and reinforce each other. Consequently, the embodiment of control system in FIG. 11 provides a doubly-reinforced, single sideband, suppressed-carrier signal having a frequency of thirteen million, nine hundred and ninety-eight thousand, five hundred cycles per second. That signal will appear at the terminals of the output winding 262 of the transformer 260, and that signal will essentially constitute the only signal appearing at those terminals. This means that the embodiment of control system in FIG. 11 can, in principle, produce the desired theoretically-perfect, signal sideband, suppressed-carrier signal.

In the embodiment of control system shown in FIG.11, the upper sideband developed by the upper section of the modulator 132 was bucked and cancelled by a sideband developed by the upper section of the modulator 134; and the upper sideband developed by the lower section of the modulator 132 was bucked and cancelled by a sideband developed by the lower section of the modulator 134. If it were desirable to cancel the lower sideband developed by the upper section of the modulator 132 and to cancel the lower sideband developed by the lower section of the modulator 132, that cancellation could be effected by reversing the leads connected to the upper and lower terminals of the secondary winding 316 of the transformer 314. Specifically, the cancelling of the lower sidebands, and the concomitant reinforcing of the upper sidebands, developed by the upper and lower sections of the modulator 132 could be effected by dis-connecting the lower terminal of the capacitor 318 from the upper terminal of the secondary winding 316 and connecting it to the lower terminal of that secondary winding 316 and by dis-connecting the lower terminal of the capacitor 322 from the lower terminal of that secondary winding and connecting it to the upper terminal of that secondary winding.

The lower sidebands developed by the upper and lower sections of the modulator 132 of FIG. 11 could be cancelled and the upper sidebands developed by those upper and lower sections could be reinforced by disconnecting the upper terminal of the secondary winding 210 from the junction 248 and connecting it to the junction 286 and by disconnecting the lower terminal of the secondary winding 222 from the junction 286 and connecting it to the terminal 248.

In view of the foregoing, it should be apparent that the control system of FIG. 11 can provide a single sideband suppressed-carrier signal that has a frequency above or below the frequency of the carrier signal. Moreover, it should be apparent that by changing the frequencies of the carrier signal and of the modulating signal, that control system can provide many desired frequencies for the single sideband, suppressed-carrier signal produced thereby.

CONTROL SYSTEM OF FIG. 12

Referring to FIG. 12, the numeral 340 denotes a terminal which is connectable to a suitable source of a carrier signal; and a conductor 342, an inductor 346, and a capacitor 348 couple that terminal to a junction 350. The conductor 342 is provided with shielding 344, and that shielding is connected to ground.

The numeral 352 denotes a terminal which is connectable to a suitable source of modulating signals; and a junction 354 and a resistor 358 connect that terminal to a junction 360. A capacitor 356 connects the junction 354 to the ground, and that capacitor will coact with that resistor to by-pass noise, transients and high frequency signals to ground.

The numeral 362 denotes a varactor which has the anode thereof connected to the junction 360, and which has the cathode thereof connected to ground by the primary winding 366 of a transformer 368, a junction 369, a capacitor 370, and junctions 372 and 374. That varactor, that primary winding and that capacitor constitute a series-resonant circuit which is tuned to resonate at the frequency of the carrier signal applied to the terminal 340.

The numeral 364 denotes a varactor which has the cathode thereof connected to the junction 350, and which has the anode thereof connected to ground by the primary winding 380 of a transformer 382, a junction 386, a capacitor 388, and the junctions 372 and 374. That varactor, that primary winding and that capacitor constitute a series-resonant circuit which is tuned to resonate at the frequency of the carrier signal applied to the terminal 340.

A terminal 390 is connectable to a source of regulated positive eight volts, and that terminal is connected to the junction 369 by a conductor 392. A terminal 394 is connectable to a source of regulated negative eight volts, and that terminal is connected to the junction 386 by a conductor 396. If desired, de-coupling capacitors and resistors, of the type shown in FIG. 11, could be connected between the conductors 392 and 396 and the terminals 390 and 394.

The secondary winding 371 of the transformer 368 has the lower terminal thereof connected to ground by the junction 374; and it has the upper terminal thereof connected to a junction 399 by a diode 398. The secondary winding 384 of the transformer 382 has the upper terminal thereof connected to ground by the junction 374; and it has the lower terminal thereof connected to a junction 406 by a diode 404. An adjustable capacitor 400 is connected between the junction 399 and ground by a junction 402; and an adjustable capacitor 408 is connected between the junction 406 and ground by the junction 402. The numeral 410 denotes the center-tapped primary winding of a transformer 412; and the upper terminal of that primary winding is connected to the junction 399 while the lower terminal of that primary winding is connected to the junction 406. The center-tap of that primary winding is coupled to ground by a junction 416, an indicator 418, a junction 420, a capacitor 422 and the junction 402. A resistor 424 is connected in parallel with the inductor 418 by the junction 416, a junction 423, and the junction 420. The numeral 426 denotes a terminal that is connectable to the output of a phase-shifting network which has the modulating signal that is applied to the terminal 352 applied to the input terminal thereof; and the terminal 426 is connected to the junction 420 by a conductor 328 and the junction 423. The secondary winding of the transformer 412 is denoted by the numeral 414; and the terminals of that secondary winding are connectable to a driver stage or an antenna.

The varactors 362 and 364, the primary windings 366 and 380, and the capacitors 370 and 388 constitute a modulator which is substantially identical to the modulator 132 shown in FIG. 11; and that modulator is denoted by the numeral 376. The diodes 398 and 404, the secondary windings 371 and 384, and the adjustable capacitors 400 and 408 constitute a modulator that is similar to the modulator 134 in FIG. 11; and that modulator is denoted by the numeral 378. The primary winding 410 and the secondary winding 414 constitute a subtracting network, and that subtracting network is denoted by the numeral 379.

The modulator 376 will respond to the application of a carrier signal to the terminal 340 and to the application of a modulating signal to the terminal 352 to develop an upper sideband and a lower sideband represented by the phasors 36 and 38 in FIG. 5 and to develop an upper sideband and a lower sideband represented by the phasors 37 and 39 in FIG. 5—all as explained hereinbefore in connection with the modulator 132 in FIG. 11. The upper section of the modulator 376 will apply the carrier signal, the upper sideband represented by the phasor 36, and the lower sideband represented by the phasor 38 to the upper section of the modulator 378; and the conductor 428 and the inductor 418 will apply the phase-shifted portion of the modulating signal to the upper section of the latter modulator. The diode 398 will be forward-biased and back-biased by the application to the anode thereof of the carrier signal and of the said sidebands, and also will be forward-biased and back-biased by the application to the cathode thereof of the modulating signal. The upper section of the modulator 378 will respond to the forward-biasing and back-biasing of the diode 398 to develop an upper sideband represented by the phasor 50 in FIG. 7 and to develop a lower sideband represented by the phasor 52. The amplitudes of those sidebands will be the same as the amplitudes of the sidebands represented by the phasors 36 and 38; and hence the upper sidebands will buck and cancel each other while the lower sidebands will aid and reinforce each other. The upper section of the modulator 378 also will respond to the forward-biasing and back-biasing of the diode 398 to develop a spurious upper sideband, a spurious lower sideband, and signals having the frequency of the carrier signal—in the manner in which the upper section of the modulator 134 of FIG. 11 develops such spurious sidebands and signals.

The lower section of the modulator 376 will apply the carrier signal, the upper sideband represented by the phasor 37 in FIG. 5, and the lower sideband represented by the phasor 39 in FIG. 5 to the lower section of the modulator 378; and the conductor 428 and the inductor 418 will apply the phase-shifted portion of the modulating signal to the lower section of the latter modulator. The diode 404 will be forward-biased and back-biased by the application to the cathode thereof of the carrier signal and of the said sidebands, and also will be forward-biased and back-biased by the application to the anode thereof of the modulating signal. The lower section of the modulator 378 will respond to the forward-biasing and back-biasing of the diode 404 to develop an upper sideband represented by the phasor 51 in FIG. 7 and to develop a lower sideband represented by the phasor 53. The amplitudes of those sidebands will be the same as the amplitudes of the sidebands represented by the phasors 37 and 39; and hence the upper sidebands will buck and cancel each other while the lower sidebands will aid and reinforce each other. Because the orientation of the diode 404 is opposite to that of the diode 398, the reinforced lower sideband developed by the lower section of the modulator 378 will be displaced one hundred and eighty degrees from the reinforced lower sideband developed by the upper section of that modulator.

The carrier signal and the signals having the frequency of the carrier signal which appear at the junction 399 of the upper section of the modulator 378 will be in phase with the carrier signal and the signals having the frequency of that carrier signal which appear at the junction 406 of the lower section of that modulator; and hence those signals will buck and cancel each other in the subtracting network 379—in the manner in which "in phase" signals buck and cancel each other in the subtracting network 138 of FIG. 11. Similarly, the spurious upper sideband and the spurious lower sideband which appear at the junction 399 will be in phase with the spurious upper sideband and the spurious lower sideband which appear at the junction 406 and those spurious sidebands will buck and cancel each other in the subtracting network 379. However, the reinforced lower sideband which appears at the junction 399 will be one hundred eighty degrees out of phase with the reinforced lower sideband which appears at the junction 406; and hence those reinforced lower sidebands will aid and reinforce each other in the subtracting network 279. This means that the embodiment of control system shown in FIG. 12 will, in principle, provide a theoretically-perfect single sideband, suppressed-carrier signal.

If desired, the embodiment of control system shown in FIG. 12 could be adjusted to cause the lower sidebands to buck and cancel each other and to cause the upper sidebands to aid and reinforce each other. This could be done by using a phase-shifting network that would phase-shift the modulating signal two hundred and seventy degrees before applying that modulating signal to the terminal 426. This also could be done by disconnecting the upper terminal of the secondary winding 371 from the anode of the diode 398 and connecting it to the cathode of the diode 404 and by disconnecting the lower terminal of the secondary winding 384 from the cathode of the diode 404 and connecting it to the anode of the diode 398.

The resistor 424 is connected in parallel with the inductor 418 to provide substantially constant loading of the modulator 376. Absent that resistor, the modulator 378 would, in the absence of modulation, tend to reflect the output of the modulator 376 back into that modulator; and such reflection would be undesirable. With the resistor 424, the output of the modulator 376 passes into the modulator 378 and then to the load connected to the terminals of the secondary winding 414 or to the resistor 424, whether or not modulation is occurring. That resistor has an ohmic value which is one quarter of the impedance value of the load connected to the terminals of the secondary winding 414; and hence that resistor will absorb just a small amount of the output power when modulation is occurring but will absorb the major portion of the output power when no modulation is occurring. As a result, the loading on the modulator 376 will remain substantially constant for all conditions of modulation.

CONTROL SYSTEM OF FIG. 13

Referring to FIG. 13, the numeral 440 denotes a terminal which is connectable to a suitable source of modulating signals; and a junction 442 connects that terminal to the upper terminal of the primary winding 444 of a transformer 446. The upper terminal of the secondary winding 448 of that transformer is connected to a junction 450, and the lower terminal of that secondary winding is connected to a terminal 454 by a resistor 452; and the terminal 454 will be connected to a suitable source of a carrier signal. A biasing battery 456 and an inductor 458 connect the junction 450 to the anode of a varactor 460; and a biasing battery 464 and an inductor 466 connect the junction 450 to the cathode of a varactor 468. The cathode of the varactor 460 is connected to the upper input terminal of a differential amplifier 469 by a junction 462; and the anode of the varactor 468 is connected to the lower input terminal of that differential amplifier by a junction 470.

The numeral 472 denotes a terminal which is connectable to an outlet of a phase-shifting network which has applied to the input thereof the modulating signal that is applied to the terminal 440. A junction 474 connects the terminal 472 to the lower terminal of the primary winding 444 of the transformer 446, and also connects the terminal 472 to the upper terminal of the primary winding 476 of a transformer 478. The lower terminal of that primary winding is connected to ground. The upper terminal of the secondary winding 480 of the transformer 478 is connected to the junction 442, and the lower terminal of that secondary winding is connected to a junction 482. A biasing battery 484 connects the junction 482 to the cathode of a varactor 486; and the anode of that varactor is connected to the junction 462. A biasing battery 488 connects the junction 482 to the anode of a varactor 490, and the cathode of that varactor is connected to the junction 470. The output of the differential amplifier 469 is denoted by the numeral 492.

The varactor 460, the varactor 486, and the inductor 458 constitute a series-resonant circuit that is tuned to resonate at the frequency of the carrier signal applied to the terminal 454. Similarly, the varactor 468, the varactor 490, and the inductor 466 constitute a series-resonant circuit that is tuned to resonate at the frequency of the carrier signal applied to the terminal 454.

In the operation of the control system shown by FIG. 13, the modulating signal applied to the terminal 440 will alternately be positive-going and negative-going. At any instant when that modulating signal is positive-going, it will develop a positive-going voltage at the upper terminal of the primary winding 444 of the transformer 446 and will develop a negative-going signal at the upper terminal of the secondary winding 448 of that transformer—and thus at the junction 450; and, simultaneously, the positive-going voltage at the terminal 440 will apply a positive-going voltage to the junction 482. The negative-going voltage at the junction 450 will add to the reverse bias on the varactor 460, and the positive-going voltage at the junction 482 will add to the reverse bias on the varactor 486; and the negative-going voltage at the junction 450 will subtract from the reverse bias on the varactor 468, and the positive-going voltage at the junction 482 will subtract from the reverse bias on the varactor 490. Conversely, at any instant when the modulating signal applied to the terminal 440 is negative-going, it will subtract from the reverse bias applied to the varactors 460 and 486 and will add to the reverse bias applied to the varactors 468 and 490. This means that the modulating signal applied to the terminal 440 will simultaneously increase the capacitances of varactors 460 and 486 while decreasing the capacitances of varactors 468 and 490, or will simultaneously decrease the capacitances of the varactors 460 and 486 while increasing the capacitances of the varactors 468 and 490.

The varactors 460 and 486 will thus respond to the application of the carrier signal to the terminal 454 and the application of the modulating signal to the terminal 440 to provide modulation which is displaced one hundred and eighty degrees from the modulation provided by the varactors 468 and 490 in response to the application of those signals to those terminals. The varactor 460, the varactor 486, and the inductor 458 will respond to the application of the carrier signal to the terminal 454 and to the application of the modulating signal to the terminal 440 to develop an upper sideband and a lower sideband corresponding to the upper and lower sidebands represented by the phasors 36 and 38 in FIG. 5; and the varactor 468, the varactor 490, and the inductor 466 will respond to the application of the carrier signal to the terminal 454 and to the application of the modulating signal to the terminal 440 to develop an upper sideband and a lower sideband corresponding to the upper and lower sidebands represented by the phasors 37 and 39 in FIG. 5.

The modulating signal will be shifted ninety degrees by a suitable phase-shifting network and will then be applied to the terminal 472; and, whenever that modulating signal is positive-going, it will develop a positive-going voltage at the lower terminal of the primary winding 444 of the transformer 446 and a positive voltage at the upper terminal of the primary winding 476 of the transformer 478. A positive-going voltage at the lower terminal of the primary winding 444 of the transformer 446 will cause a positive-going voltage to appear at the upper terminal of the secondary winding 448 of the transformer 446, and thus at the junction 450; and that positive-going voltage will increase the capacitance of the varactor 460 but will decrease the capacitance of the varactor 468. The positive voltage at the upper terminal of the primary winding 476 of the transformer 478 will cause a positive voltage to appear at the lower terminal of the secondary winding 480 of that transformer—and thus at the junction 482; and that voltage will decrease the capacitance of the varactor 486 and increase the capacitance of the varactor 490. Conversely, whenever the voltage at the terminal 472 is negative-going, a negative-going voltage will be applied to the junction 450, and that voltage will decrease the capacitance of the varactor 460 and increase the capacitance of the varactor 468; and, simultaneously, a negative-going voltage will appear at the junction 482, and that voltage will increase the capacitance of the varactor 486 and decrease the capacitance of the varactor 490. This means that the application of a modulating signal to the terminal 472 will simultaneously change the capacitances of the varactors 460, 468, 486 and 490; and it means that the capacitance of the varactor 460 will increase whenever the capacitance of the varactor 468 decreases, and vice versa, and it means that the capacitance of the varactor 486 will increase whenever the capacitance of the varactor 490 decreases, and vice versa.

The modulating signal applied to the terminal 472 causes the capacitances of the varactors 460 and 486 to move in opposite directions but leaves the sum of the capacitances of those varactors unchanged; and it causes the capacitances of the varactors 468 and 490 to move in opposite directions but leaves the sum of those capacitances unchanged. The varactors 460 and 486 constitute a capacitive voltage divider for the upper input of the differential amplifier 469; and hence the oppositely-directed changes in the capacitances of those varactors will change the upper input signal for that differential amplifier. Similarly, the varactors 468 and 490 constitute a capacitive voltage divider for the lower input of the differential amplifier 469; and hence the oppositely-directed changes in the capacitances of those varactors will change the lower input signal for that differential amplifier. Consequently, the modulation provided by the upper section of the modulator shown in FIG. 13, in response to the modulating signal applied to the terminal 472 will be along a modulation axis similar to the modulation axis 44 in FIGS. 6 and 7; and that modulation will develop upper and lower sidebands represented by the phasors 50 and 52 in FIG. 7. The modulation provided by the lower section of that modulator in response to the modulating signal applied to the terminal 472 will be along that same modulation axis; and that modulation will develop upper and lower sidebands represented by the phasors 51 and 53 in FIG. 7. The amplitudes of the upper sidebands represented by the phasors 36, 37, 50 and 51 will be equal; and the sidebands represented by the phasors 36 and 50 will be displaced one hundred and eighty degrees from each other, and the sidebands represented by the phasors 37 and 51 will be displaced one hundred and eighty degrees from each other. As a result, those upper sidebands will buck and cancel each other.

The amplitudes of the lower sidebands represented by the phasors 38, 39, 52 and 53 will be equal; and the sidebands represented by the phasors 38 and 52 will be in phase, and the sidebands represented by the phasors 39 and 53 will be in phase. However, the sidebands represented by the phasors 38 and 52 will be displaced one hundred and eighty degrees from the sidebands represented by the phasors 39 and 53.

The varactors 460 and 486 will respond to the modulating signal applied to the terminal 472 to modulate the sidebands represented by the phasors 36 and 38 in FIG. 5; and that modulation will develop a spurious upper sideband, a spurious lower sideband,, and signals having the frequency of the carrier signal. Similarly, the varactors 468 and 490 will respond to the modulating signal applied to the terminal 472 to modulate the sidebands represented by the phasors 37 and 39 in FIG. 5; and that modulation will develop a spurious upper sideband, a spurious lower sideband, and signals having the frequency of the carrier signal. The differential amplifier 469 will act as a subtracting network; and it will cancel any equal amplitude signals that are in phase and that are applied to the upper and lower input terminals thereof. This means that the said differential amplifier will cancel those portions of the un-modulated carrier signal which appear at the junctions 462 and 470, will cancel the signals which have the frequency of the carrier signal and which appear at the junctions 462 and 470, will cancel the spurious upper sidebands which appear at the junctions 462 and 470, and will cancel the spurious lower sidebands which appear at the junctions 462 and 470. However, that differential amplifier will cause the reinforced lower sideband represented by the phasors 38 and 52 to aid and reinforce the reinforced lower sideband represented by the phasors 39 and 53. As a result, the embodiment of control system shown in FIG. 13 can, in principle, provide a theoretically-perfect single sideband, suppressed-carrier signal.

CONCLUSION

The control system provided by the present invention is desirable for voice communication; because the single sideband suppressed-carrier signal produced by it reduces the amount of the radio frequency spectrum that is required to send that signal. Furthermore, that control system is desirable for voice communication; because the single sideband suppressed-carrier signal produced by it has an extremely high power efficiency relative to the power efficiency of amplitude-modulated signals and frequency-modulated signals due to the high peak-to-R.M.S. value of speech. The control system provided by the present invention is ideal for communication systems wherein the power is supplied by batteries and must be conserved. That control system also is desirable because the overall circuit is simple, uses only a small number of components, and make the control system relatively inexpensive.

The control system provided by the present invention is useful in frequency synthesis and in frequency conversion. The conventional mixer circuits that normally are used for frequency synthesis generate sum, difference and spurious harmonically-related outputs, and then the desired signal is filtered out; whereas the control system provided by the present invention can avoid the generation of the undesired harmonic outputs, and can thereby greatly reduce and possibly eliminate the filter requirement. Because that control system will not generate some of the undesired outputs that are generated by conventional mixer circuits used in frequency synthesis and frequency conversion, that control system can avoid the generation of some of the signals which are generated by those mixer circuits which are virtually impossible to filter.

The envelope of the output voltage of the control system provided by the present invention is the square root of the sum-of-the-squares of the un-shifted modulating signal voltage and of the phase-shifted modulating signal voltage. That fact enables the control system provided by the present invention to be used in coordinate conversion systems. The control system provided by the present invention also can be used as a two-channel suppressed-carrier multiplexer.

The modulation axes 30 and 44 of FIGS. 4 and 5 and of FIGS. 6 and 7, respectively, are linear; and this is very desirable, because it enables any modulator which develops either of those modulation axes to develop just one upper sideband and just one lower sideband. However, if more than one upper sideband or more than one lower sideband per modulation was desirable or permissible, one or more of the modulators shown by the drawing could be modified to permit some non-linearity in the modulation axes 30 and 44.

Subtracting networks are disclosed in the drawing to cancel out the carrier signal, the signals having the frequency of the carrier signal, the spurious upper sidebands, and the spurious lower sidebands; but summing networks can be used instead of subtracting networks. Where such summing networks are used, the carrier signal, the signals having the frequency of the carrier signal, the spurious upper sideband and the spurious lower sideband of the upper section of the embodiment of control system must be one hundred and eighty degrees out of phase from the carrier signal, the signals having the frequency of the carrier signal, the spurious upper sideband, and the spurious lower sideband of the lower section of the embodiment of control system. Also the desired sideband of the upper section of the embodiment of control system must be in phase with the desired sideband of the lower section of the embodiment of control system. If desired, the carrier signal, the signals having the frequency of the carrier signal, the spurious upper sidebands, and the spurious lower sidebands can be removed or attenuated by utilizing an electric wave filter. Also, if desired, the carrier signal can be removed or attenuated by injecting an oppositely-polarized portion of the carrier signal into the output of the control system.

Varactor-equipped modulators, such as those shown in FIGS. 11–13 are preferred, because such modulators are simple and provide a high level of efficiency. However, other modulators can be used to develop axes of modulation which are angularly displaced from the carrier signal. For example, the inductors in the modulators 132 and 376 of FIGS. 11 and 12 could be replaced by saturable reactors, and the varactors of those modulators could be replaced by capacitors. Where that was done, the resulting series-resonant circuits would respond to the modulating signals to cause those modulators to develop modulation axes that were angularly displaced from the carrier signals. Also, a modulator that produced amplitude-modulated signals could have the carrier signal thereof suppressed, could have a portion of the carrier signal displaced a predetermined number of degrees, and could then have that displaced carrier signal introduced into that modulator to develop an axis of modulation which was angularly displaced from the carrier signal.

The use of varactors in the modulators 132 and 376 of FIGS. 11 and 12 and in the modulator of FIG. 13 is desirable because of the substantially linear curve which varactors provide when the reverse voltages thereof are plotted against the figures of merit thereof. If it ever became desirable to compensate for the non-linearity of that curve, that compensation could be provided by pre-modifying the modulating signal so the outputs of the modulators 132 and 376 of FIGS. 11 and 12 and of the modulator of FIG. 13 would be substantially linear relative to the modulating signals applied to the inputs of those modulators.

The modulators used in the various embodiments of control system provided by the present invention are particularly desirable, because each of them can respond to a single-frequency carrier signal to develop just one upper side band and just one lower sideband. Each of those modulators is able to respond to a single-frequency carrier signal to develop just one upper sideband and just one lower sideband because the axis of modulation developed by that modulator is a substantially straight line. In contrast, phase modulators do not develop an axis of modulation which is linear, and hence such modulators will develop a plurality of upper sidebands and a plurality of lower sidebands. As a result, it is difficult to use phase modulation to provide a single sideband suppressed-carrier signal that does not have objectionable spurious sidebands.

In the foregoing description, it was assumed that the carrier signal was a single-frequency carrier signal, and it was assumed that the modulating signal was a single-frequency modulation signal; and that assumption was made to simplify the explanation of the principles and teachings of the present invention. However, the principles and teachings of the present invention, and the embodiments of control system shown herein, are equally applicable to multi-frequency carrier signals and to multi-frequency modulating signals. Also, those principles and teachings and those embodiments of control system are applicable to random-frequency carrier signals and to random-frequency modulating signals.

The modulators 132 and 376 shown in FIGS. 11 and 12 develop axes of modulation 30 in FIGS. 4 and 5 which coact with extensions of the carrier signal phasor 20 to subtend angles A of substantially ninety degrees. The modulators 134 and 378 of FIGS. 11 and 12 develop axes of modulation 44 in FIGS. 6 and 7 which coact with the carrier signal phasor 20 to subtend angles B of substantially zero. This means that the modulation axes 44 developed by the modulators 134 and 378 of FIGS. 11 and 12 are displaced substantially ninety degrees from the modulation axes 30 developed by the modulators 132 and 376 of FIGS. 11 and 12. The phase-shifting networks used with the control systems of FIGS. 11 and 12 will provide phase shifts of substantially ninety degrees between the phase-shifted modulating signals and the unshifted modulating signals to enable the embodiments of control system of FIGS. 11 and 12 to cancel one sideband and to reinforce a second sideband. However, where desired, the angle A between the modulation axis 30 and the extension of the carrier signal phasor 20 need not be ninety degrees, and the angle B between the modulation axis 44 and the extension of the carrier signal phasor 20 need not be zero. The primary requirement of the present invention is that at least one modulation axis be developed which is displaced from another modulation axis by an angle which is large enough to enable the sum or difference of that angle and of an angle between the phase-shifted and un-shifted portions of the modulating signal to approximate one hundred and eighty degrees. Where that is done, the control system utilizing that invention can attenuate a sideband relative to a second sideband.

Full cancellation of an un-wanted sideband can be effected by the control system provided by the present invention, as pointed out hereinbefore. If desired or permitted, partial attenuation of such a sideband can be provided—by providing different amplitudes for the sidebands developed during the first and second modulations, or by displacing the sidebands by angles greater than or less than one hundred and eighty degrees.

The control systems of FIGS. 11 and 12 utilize modulators that act consecutively upon the carrier signal. However, as shown by FIG. 13, it is not necessary for a control system to have a first modulator that modulates the carrier signal and then have a second modulator that subsequently modulates that carrier signal. Instead, as shown by FIG. 13, a control system can simultaneously provide two separate and different modulations of the carrier signal.

The embodiments of control system shown by the drawing utilize two angularly-displaced modulation axes and a single phase-shift of the modulating signal. However, if desired, more than two modulation axes could be utilized to provide the required angular displacement between the first and last modulation axes, and more than one phase-shift could be utilized to provide the required supplementary shift in phase of the phase-shifted modulating signal.

The embodiments of control system shown by FIGS. 11 and 12 apply the carrier signal to the modulators 132 and 376; and then the outputs of those modulators are subsequently modulated by the modulators 134 and 378 of those embodiments of control system. If desired, those embodiments of control system could be arranged so the carrier signal was initially supplied to the modulators 134 and 378, and then the outputs of those modulators could subsequently be modulated by the modulators 132 and 376. Furthermore, if desired, the embodiments of control system provided by the present invention could produce single sideband suppressed carriers without any initial reinforcement of the desired sidebands—those embodiments of control system attenuating all of the sidebands, but attenuating the undesired sidebands to a greater degree than they attenuate the desired sidebands. In view of the foregoing, it should be apparent that the principles and teachings of the present invention can be embodied in many different forms; and hence, although the drawing and accompanying description have shown and described various preferred embodiments of the control system provided by the present invention, it should be apparent to those skilled in the art that various changes may be made in the form of the invention without affecting the scope thereof.

What I claim is:

1. A control system for developing a sideband of a given amplitude and for developing a second sideband of a different amplitude which comprises:

means responding to a carrier signal and a modulating signal to develop a modulation axis, second means responding to said carrier signal after it has been modulated by the first said means and to a second modulating signal to develop a second modulation axis, phase-shifting means to provide a phase-shift of a predetermined number of degrees between the first said modulating signal and said second modulating signal, said second modulation axis being angularly displaced from the first said modulation axis by a predetermined angle which is greater than zero and less than one hundred and eighty degrees, and the sum of said predetermined angle and of the phase-shift provided by said phase-shifting means approximating one hundred and eighty degrees, at least one of said modulation axes being angularly displaced from said carrier signal, being generally linear, containing the phasor sum of the upper and lower sidebands which are developed as said one modulation axis is developed, and having the resultant phasors thereof experience changes in the amplitudes thereof, the other of said modulation axes also being generally linear.

2. A control system for developing a sideband of a given amplitude and for developing a second sideband of a different amplitude as claimed in claim 1 wherein said first said means and said second means are parts of a modulator.

3. A control system for developing a sideband of a given amplitude and for developing a second sideband of a different amplitude as claimed in claim 1 wherein said first said means is a modulator, and wherein said second means is a modulator.

4. A control system for developing a sideband of a given amplitude and for developing a second sideband of a different amplitude as claimed in claim 1 wherein said predetermined angle is substantially ninety degrees, and wherein said angle through which said phase-shifting means phase-shifts said modulating signal is substantially ninety degrees.

5. A control system for developing a sideband of a given amplitude and for developing a second sideband of a different amplitude as claimed in claim 1 wherein said first said means is a tuned circuit of a modulator, and wherein said second means is a further tuned circuit of said modulator.

6. A control system for developing a sideband of a given amplitude and for developing a second sideband of a different amplitude as claimed in claim 1 wherein said first said means is a modulator, and wherein said second means is a modulator, one of said modulators providing amplitude-modulation and the other of said modulators providing compound modulation.

7. A control system for developing a sideband of a given amplitude and for developing a second sideband of a different amplitude as claimed in claim 1 wherein said first said means is a modulator and the first said modulation axis is substantially straight, said first said means essentially developing just an upper sideband and a lower sideband.

8. A control system for developing a sideband of a given amplitude and for developing a second sideband of a different amplitude as claimed in claim 1 wherein said first said means is a modulator and develops a first sideband and a second sideband, wherein said second means is a modulator and develops a third sideband and a fourth sideband, wherein said third sideband and said first sideband buck and thereby attenuate each other, and wherein said second sideband and said fourth sideband aid and thereby reinforce each other.

9. A control system for eveloping a sideband of a given amplitude and for developing a second sideband of a different amplitude as claimed in claim 1 wherein said first said means is a modulator and develops a first sideband and a second sideband, wherein said second means is a modulator and develops a third sideband and a fourth sideband, wherein said third sideband and said first sideband buck and thereby attenuate each other, wherein said second sideband and said fourth sideband aid and thereby reinforce each other, said second means making the amplitudes of said first and third sidebands substantially equal, said second means making the amplitudes of said second and said fourth sidebands substantially equal.

10. A control system for developing a sideband of a given amplitude and for developing a second sideband of a different amplitude as claimed in claim 1 wherein said first said means includes varactors, and wherein said second means also includes varactors.

11. A control system for developing a sideband of a given amplitude and for developing a second sideband of a different amplitude as claimed in claim 1 wherein said first said means is a modulator, wherein said second means is a modulator, and wherein said second means has an impedance in the output thereof that provides substantially constant loading for said second means.

12. A control system for developing a sideband of a given amplitude and for developing a second sideband of a different amplitude as claimed in claim 1 wherein said first said means is a modulator, wherein said second said means is a modulator, and wherein said second said means has a resistor and an impedance connected in the output thereof, said resistor having an ohmic value specifically related to that of the load connectable to said second said means, whereby said resistor will absorb just a small percentage of the power supplied by said second said means when modulation is occurring but will absorb the major percentage of the power supplied by said second said means when no modulation is occurring.

13. In a control system which can develop but attenuate a sideband and which can develop and reinforce a second sideband, the improvement which comprises a modulator that is connectable to a source of a carrier signal having a given axis and that also is connectable to a source of a modulating signal and that responds to said carrier signal and to said modulating signal to develop a modulation axis which is substantially straight and which is angularly displaced from said axis of said carrier signal and which contains the phasor sum of the upper and lower sidebands developed by said modulator and which has the resultant phasors thereof experience changes in the amplitude thereof, whereby said modulator can provide compound modulation of said carrier signal, a second modulator that develops a modulation axis which is substantially straight and which is angularly displaced from said modulation axis of the first said modulator and which contains the phasor sum of the upper and lower sidebands developed by said second modulator, and means applying the output of one of said modulators to the input of the other of said modulators, whereby said other modulator modulates a modulated carrier signal, the angular displacement of said modulation axis of said second modulator from said modulation axis of the first said modulator causing at least one sideband developed by said other modulator to aid at least one sideband developed by said one modulator to provide said reinforced sideband.

14. In a control system which can develop but attenuate a sideband and which can develop and reinforce a second sideband as claimed in claim 13 wherein the angle between first said modulation axis and said axis of said carrier signal is substantially ninety degrees.

15. In a control system which can develop but attenuate a sideband and which can develop and reinforce a second sideband as claimed in claim 15 wherein first said modulator includes a resonant circuit that resonates at a frequency close to the frequency of said carrier signal, and wherein a modulating signal coacts with said resonant circuit to develop upper and lower sidebands.

16. In a control system which can develop but attenuate a sideband and which can develop and reinforce a second sideband as claimed in claim 13 wherein the first said modulator includes a plurality of varactors and wherein the capacitances of said varactors are varied by modulating signals.

17. In a control system which can develop but attenuate a sideband and which can develop and reinforce a second sideband the improvement which comprises a modulator that is connectable to a source of a carrier signal having a given axis and that also is connectable to a source of modulating signal and that responds to said carrier signal and to said modulating signal to develop a modulation axis which is substantially straight and which is angularly displaced from said axis of said carrier signal and which contains the phasor sum of the upper and lower sidebands developed by said modulator and which has the resultant phasors thereof experience changes in the amplitude thereof, whereby said modulator can provide compound modulation of said carrier signal, a second modulator that develops a modulation axis which is substantially straight and which is angularly displaced from said modulation axis of the first said modulator and which contains the phasor sum of the upper and lower sidebands developed by said second modulator, means applying the output of one said modulators to the input of the other of said modulators, whereby said other modulator modulates a modulated carrier signal, the angular displacement of said modulation axis of said second modulator from said modulation axis of the first said modulator causing at least one sideband developed by said other modulator to said at least one sideband developed by said one modulator to provide said reinforced sideband, the first said modulator including a plurality of varactors, a first input connecting modulating signals to said varactors to provide similarly-polarized variations in the capacitances of said varactors, and a second input connecting modulating signals to said varactors to provide oppositely-polarized variations in the capacitances of said varactors.

18. In a control system which can develop but attenuate a sideband and which can develop and reinforce a second sideband and which comprises a first input for modulating signals, a second input for modulating signals, a plurality of varactors, means connecting the first said input to said varactors to enable said varactors to respond to modulating signals to provide similarly-polarized changes in the capacitances thereof, and means connecting said second input to said varactors to enable said varactors to respond to modulating signals to provide oppositely-polarized changes in the capacitances thereof, said varactors responding to said similarly-polarized changes in the capacitances thereof to develop one axis of modulation that is substantially straight, said varactors responding to said oppositely-polarized changes in the capacitances thereof to develop a second axis of modulation that is substantially straight and that is angularly displaced from said one axis of modulation.

19. In a control system which can develop but attenuate a sideband and which can develop and reinforce a second sideband and which comprises a first input for modulating signals, a second input for modulating signals, a resonant circuit, means connecting the first said input to said resonant circuit to enable said resonant circuit to respond to modulating signals to provide similarly-polarized changes in the impedances of predetermined components of said resonant circuit, and means connecting said second input to said resonant circuit to enable said resonant circuit to respond to modulating signals to provide oppositely-polarized changes in said impedances of said perdetermined components of said resonant circuit responding to said similarly-polarized changes in impedance to develop one axis of modulation that is substantially straight, said predetermined components of said resonant circuit responding to said oppositely-polarized changes in impedance to develop a second axis of modulation that is substantially straight and that is angularly displaced from said one axis of modulation.

20. A control system for developing and attenuating a sideband, for developing and reinforcing a second sideband, for developing and attenuating a third sideband, and for developing and reinforcing a fourth sideband which comprises:

means responding to a carrier signal and a modulating signal to develop a modulation axis, second means responding to said carrier signal after it has been modulated by the first said means and to a second modulating signal to develop a second modulation axis, phase-shifting means to provide a phase-shift of a predetermined number of degrees between the first said modulating signal and said second modulating signal, said second modulation axis being angularly displaced from the first said modulation axis by a predetermined angle, and the sum of said predetermined angle and of said phase-shift provided by said phase-shifting means approximately one hundred and eighty degrees, said phase-shifting means phase-shifting said modulating signal one hundred and eighty degrees and also phase-shifting said modulating signal by an angle substantially equal to the sum of one hundred and eighty degrees plus said phase-shift, at least one of said modulation axes being angularly displaced from said carrier signal, being generally linear, containing the phasor sum of the upper and lower sidebands which are developed as said one modulation axis is developed, and having the resultant phasors thereof experience changes in the amplitudes thereof, the other of said modulation axes also being generally linear, third means responding to said carrier signal and said modulating signal after said modulating signal has been displaced one hundred and eighty degrees to develop a third modulation axis that is substantially idential to the first said modulation axis but which has the phasors thereof one hundred and eighty degrees out of phase with the corresponding phasors developed by the first said means, and fourth means responding to the modulated carrier signal from said third means and said modulating signal after said modulating signal has been displaced by said angle, substantially equal to the sum of one hundred and eighty degrees plus said phase-shift, to develop a fourth modulation axis that is substantially identical to said second modulation axis but which has the phasors thereof one hundred and eighty degrees out of phase with the corresponding phasors developed by said second means, whereby the first said and said second means develop and attenuate a sideband and develop and reinforce a second sideband and whereby said third and said fourth means develop and attenuate a third sideband and develop and reinforce a fourth sideband, said second and fourth sidebands being displaced in phase approximately one hundred and eighty degrees.

21. A control system for developing and attenuating a sideband, for developing and reinforcing a second sideband, for developing and attenuating a third sideband, and for developing and reinforcing a fourth sideband as claimed in claim 20 wherein the first said means and said third means are sections of a modulator, and wherein said second means and said fourth means are sections of a second modulator.

22. A control system for developing and attenuating a sideband, for developing and reinforcing a second sideband, for developing and attenuating a third sideband, and for developing and reinforcing a fourth sideband as claimed in claim 20 wherein the first said means and said second means are sections of a modulator, and wherein said third means and said fourth means are sections of said modulator.

23. A control system for developing and attenuating a sideband, for developing and reinforcing a second sideband, for developing and attenuating a third sideband, and for developing and reinforcing a fourth sideband as claimed in claim 20 wherein a further means receives said second sideband and also receives said fourth sideband and causes said second and fourth sidebands to reinforce each other.

24. A control system for developing and attenuating a first sideband, for developing and reinforcing a second sideband, for developing and attenuating a third sideband, and for developing and reinforcing a fourth sideband as claimed in claim 20 wherein said carrier signal supplied to said second means has been modulated by the first said means and causes said second means to develop spurious sidebands, wherein said carrier signal supplied to said fourth means has been modulated by said third means and causes said fourth means to develop further spurious sidebands, and wherein a further means eliminates said spurious sidebands.

25. A control system for developing and attenuating a sideband, for developing and reinforcing a second sideband, for developing and attenuating a third sideband, and for developing and reinforcing a fourth sideband as claimed in claim 20 wherein said carrier signal supplied to said second means has been modulated by the first said means and causes said second means to develop spurious sidebands, wherein said carrier signal supplied to said fourth means has been modulated by said third means and causes said fourth means to develop further spurious sidebands, wherein the first said spurious sidebands and said further spurious sidebands are approximately in phase, and wherein a subtracting means eliminates said spurious sidebands while causing said second and fourth sidebands to reinforce each other.

References Cited

UNITED STATES PATENTS

| | | | |
|---|---|---|---|
| 2,335,934 | 12/1943 | Goldstine | 332—22 |
| 2,519,223 | 8/1950 | Cheek | 332—40X |
| 2,987,683 | 6/1961 | Powers | 332—41X |
| 3,054,073 | 9/1962 | Powers | 332—41X |
| 3,118,117 | 1/1964 | King et al. | 332—30(V)X |
| 3,243,731 | 3/1966 | Erickson | 332—30(V)X |
| 3,267,393 | 8/1966 | Brossard et al. | 332—30(V) |
| 3,363,188 | 1/1968 | Gardere | 332—41X |

ALFRED L. BRODY, Primary Examiner

U.S. Cl. X.R.

307—254, 320; 325—137; 332—45